(12) United States Patent
Tanigawa et al.

(10) Patent No.: US 9,025,217 B2
(45) Date of Patent: May 5, 2015

(54) DOCUMENT, IMAGE FORMING APPARATUS, COVER PLATE, IMAGE READING APPARATUS, IMAGE FORMING METHOD, AND IMAGE READING METHOD

(71) Applicant: Fuji Xerox Co., Ltd., Tokyo (JP)

(72) Inventors: Tomohiro Tanigawa, Kanagawa (JP); Kousuke Kubota, Kanagawa (JP); Osamu Goto, Kanagawa (JP); Ryuji Fujiki, Kanagawa (JP); Takeshi Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 31 days.

(21) Appl. No.: 13/778,790

(22) Filed: Feb. 27, 2013

(65) Prior Publication Data
US 2014/0022609 A1 Jan. 23, 2014

(30) Foreign Application Priority Data
Jul. 18, 2012 (JP) ................................. 2012-159478

(51) Int. Cl.
*H04N 1/04* (2006.01)
*H04N 1/00* (2006.01)
*H04N 1/047* (2006.01)

(52) U.S. Cl.
CPC ....... *H04N 1/00702* (2013.01); *H04N 1/00816* (2013.01); *H04N 1/047* (2013.01); *H04N 2201/0414* (2013.01); *H04N 2201/04703* (2013.01); *H04N 2201/0091* (2013.01)

(58) Field of Classification Search
CPC .......... H04N 1/00702; H04N 1/00816; H04N 1/047; H04N 2201/0414; H04N 2201/04703; H04N 2201/0091
USPC .......................... 358/488, 449, 474, 486, 497
See application file for complete search history.

(56) References Cited

U.S. PATENT DOCUMENTS 6,937,369 B2 * 8/2005 Shih et al. ...................... 358/486
7,688,477 B2 * 3/2010 Ikeno et al. .................... 358/449

FOREIGN PATENT DOCUMENTS

JP     A-2005-217509     8/2005
JP     A-2006-293213     10/2006

OTHER PUBLICATIONS

Feb. 14, 2014 Office Action issued in Australia Application No. 2013201908.

* cited by examiner

*Primary Examiner* — Houshang Safaipour
(74) *Attorney, Agent, or Firm* — Oliff PLC

(57) ABSTRACT

There is provided a document, wherein a measurement image for measuring a position of an image relative to a document is formed on a first surface thereof, a designation image for designating a document position, at which the document is placed on an image reading apparatus that reads an image, is formed on a second surface thereof, and wherein the document is spaced from an end portion of a reading region of the image reading apparatus by placing the document in accordance with the designation of the designation image, and the designation image is formed such that the measurement image is placed in the reading region of the image reading apparatus.

20 Claims, 13 Drawing Sheets

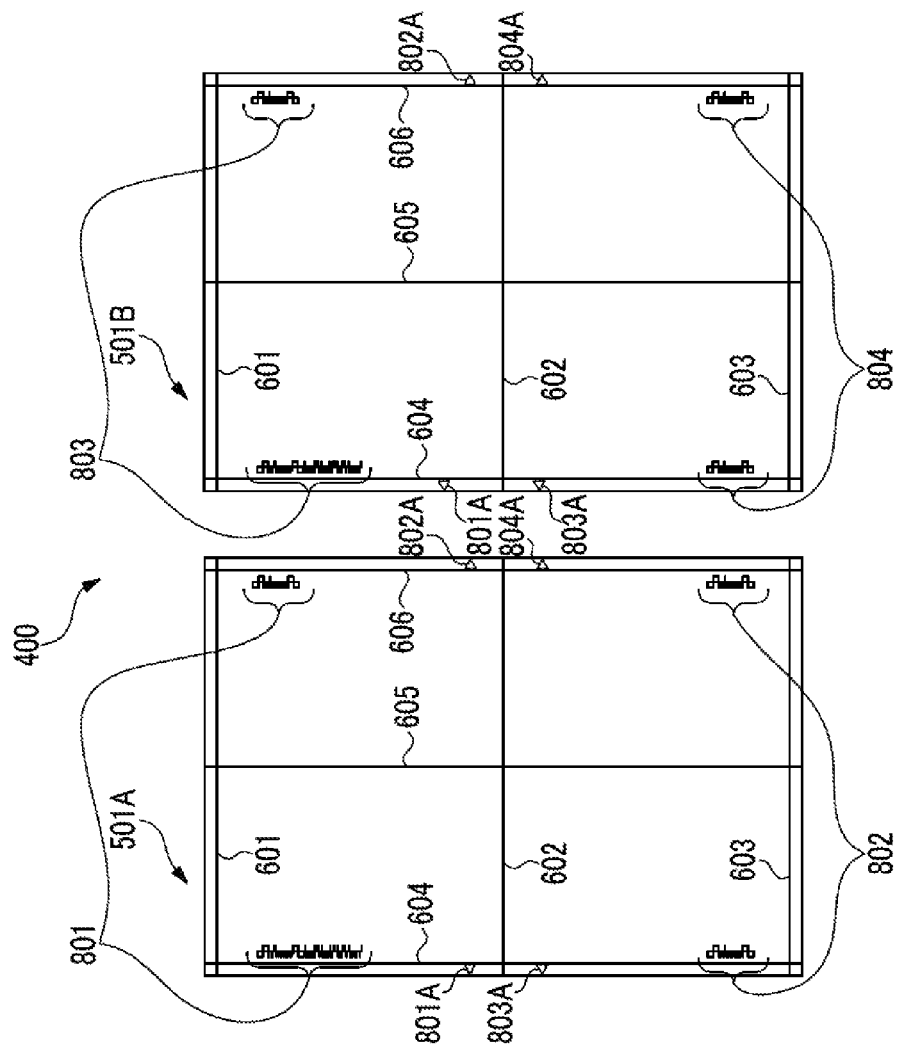

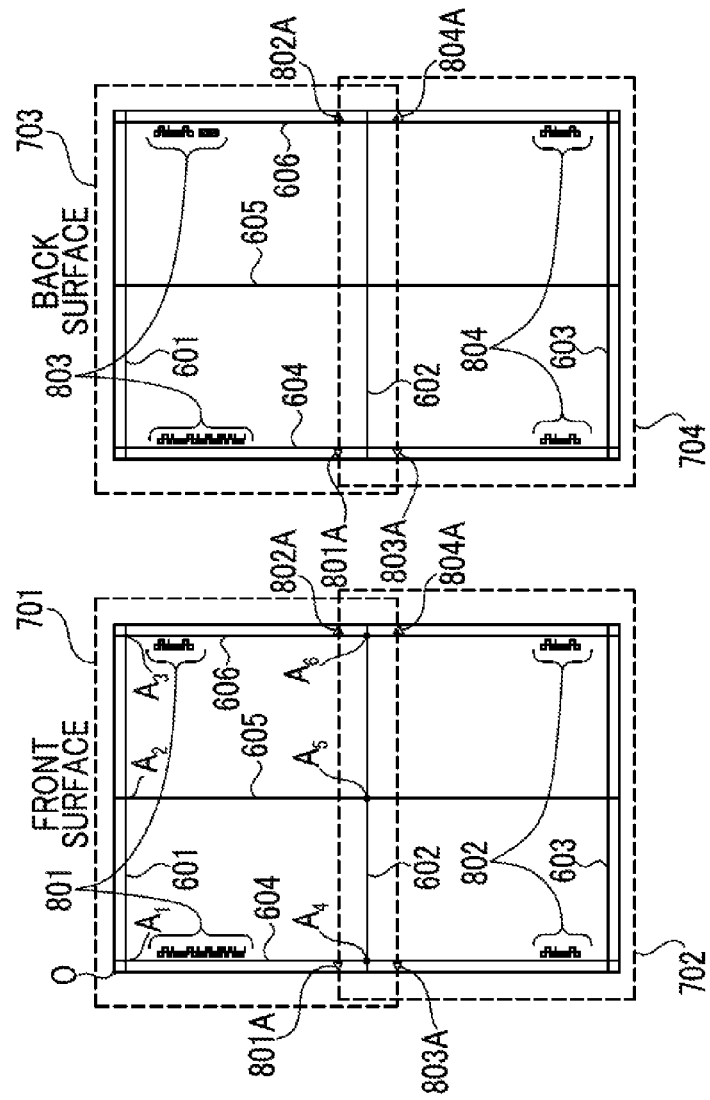

DOCUMENT, IMAGE FORMING APPARATUS, COVER PLATE, IMAGE READING APPARATUS, IMAGE FORMING METHOD, AND IMAGE READING METHOD

CROSS-REFERENCE TO RELATED APPLICATIONS

This application is based on and claims priority under 35 USC 119 from Japanese Patent Application No. 2012-159478 filed Jul. 18, 2012.

BACKGROUND

Technical Field

The present invention relates to a document, an image forming apparatus, a cover plate, an image reading apparatus, an image forming method, and an image reading method.

SUMMARY

According to an aspect of the invention, there is provided a document, wherein a measurement image for measuring a position of an image relative to a document is formed on a first surface thereof, a designation image for designating a document position, at which the document is placed on an image reading apparatus that reads an image, is formed on a second surface thereof, and wherein the document is spaced from an end portion of a reading region of the image reading apparatus by placing the document in accordance with the designation of the designation image, and the designation image is formed such that the measurement image is placed in the reading region of the image reading apparatus.

BRIEF DESCRIPTION OF THE DRAWINGS

Exemplary embodiments of the present invention will be described in detail based on the following figures, wherein:

FIG. 3 is a diagram illustrating chart images which are output;

FIG. 5 is a diagram illustrating a situation in which the reading regions of the upper and lower side parts of the front surface of FIG. 3 and the reading regions of the upper and lower side parts of the back surface of FIG. 3 for respective reading operations are overlapped on the front surface and back surface of FIG. 3;

DETAILED DESCRIPTION

Hereinafter, exemplary embodiments of the invention will be described with reference to the accompanying drawings.

First Exemplary Embodiment

Figure 1:
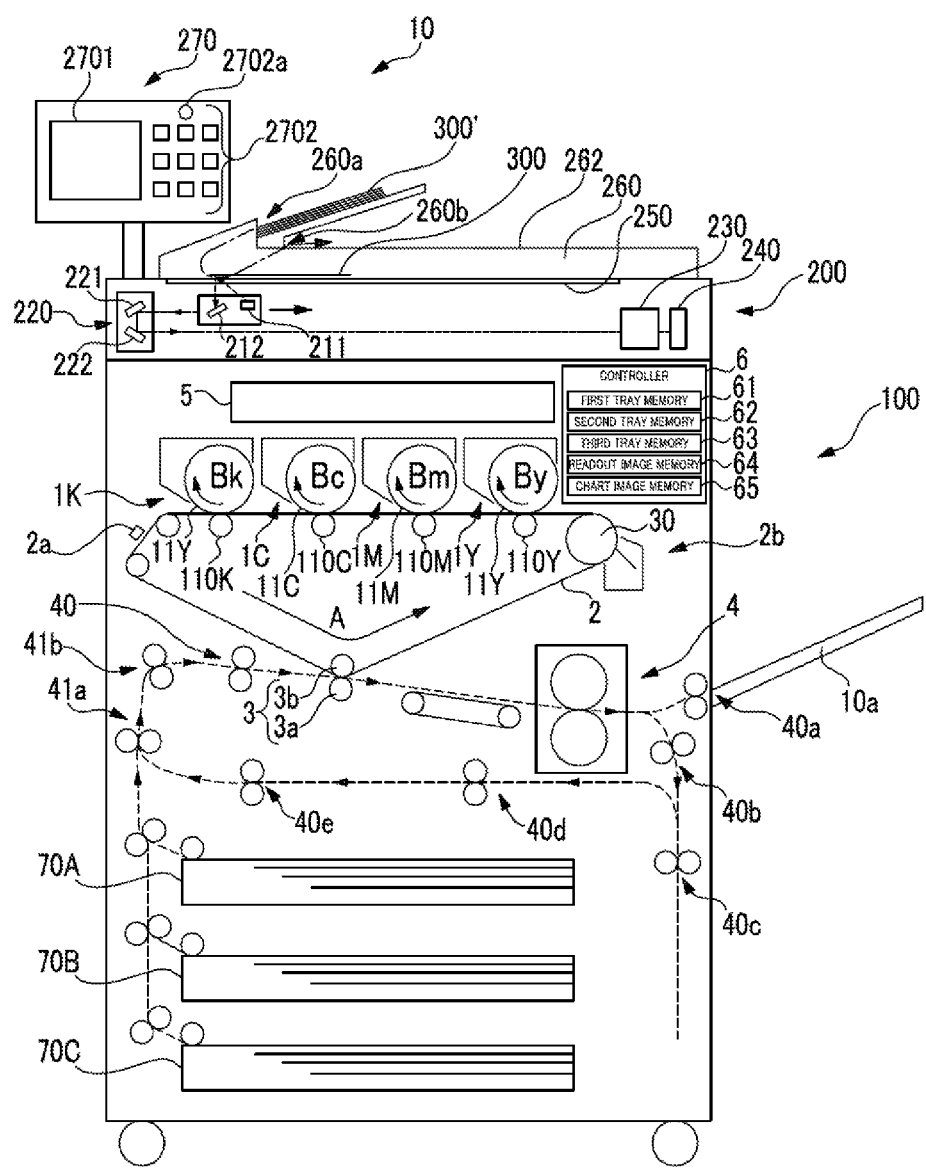
FIG. 1 is an overall configuration diagram of an image forming apparatus according to a first exemplary embodiment.

FIG. 1 is an overall configuration diagram of an image forming apparatus 10 according to a first exemplary embodiment.

The image forming apparatus according to the exemplary embodiment is a copier that not only has a simplex output function but also has a duplex output function.

The image forming apparatus 10 includes: an image reading section 200 that reads an image on a sheet of paper so as to generate image data representing the image; an image forming section 100 that forms the image, which is read on the basis of the image data, on a separate sheet of paper; and an operational section 270 that receives, from a user, various inputs of image formation information pieces such as designation of the number of output sheets, selection of the duplex/simplex output, and designation of a tray which contains the sheet of paper before image output.

The operational section 270 is provided with a touch panel type display screen 2701 and a button group 2702 that includes a start button for issuing an instruction to start image reading and image formation, numerical value buttons for inputting numerical values at the time of designating the number of output sheets and the like, and buttons for controlling the image forming apparatus. The button group 2702 also includes a correction amount calculation mode button 2702a for setting a correction amount calculation mode in the image forming apparatus 10. The mode is for calculating various correction amounts such as a correction amount of the image formation position relative to the sheet of paper at the time of image formation on the sheet of paper and a correction amount of the magnification of the image on the sheet of paper. The correction amount calculation will be described later in detail.

The image reading section 200 includes: an upper cover 260 that may be opened by a user; and a transparent glass 250 that is disposed directly beneath the cover 260. The image reading section 200 further includes components that are for reading an image on the sheet of paper and are disposed under the transparent glass 250.

The image reading section 200 has a first carriage 210, a second carriage 220, a lens section 230, and a CCD line sensor 240 as the components for image reading. The first carriage 210 has a first mirror 212 and a lamp 211, and is a component that is movable in the horizontal direction of FIG. 1. The first carriage 210 has a function of causing the lamp 211 to irradiate the reading target image with light and receiving the reflected light. The second carriage 220 has a second mirror 221 and a third mirror 222, and is a component that is movable in the horizontal direction of the drawing in a similar manner to the first carriage 210. The second carriage 220 and the lens section 230 have a function of guiding the reflected light, which is received by the first carriage 210, to the CCD line sensor 240. Further, the CCD line sensor 240 has a function of receiving the reflected light and generating image data that represents the image.

Here, the image reading section 200 has a transport reading mode and a stationary reading mode as reading modes for reading the image on the sheet of paper. In the transport reading mode, the sheets of paper 300' placed on a document tray 261 are drawn from a sheet feeding port 260a one by one, and are transported by a mechanism, which is not shown in the drawing, to a discharging port 260b through a transport path which is indicated by the chain line arrow. The transport reading mode is a reading mode in which the image on the sheet of paper being transported is read by using the first carriage 210, which is stationary, and the sheet is sent onto a sheet discharging tray 262. Further, the stationary reading mode is a reading mode in which the sheet of paper is set to be stationary on the transparent glass 250 and is read by using the first carriage 210 which is movable in the direction of the solid line arrow of the drawing. In the stationary reading mode, a surface of the transparent glass 250 facing the upper cover 260 side is formed as a sheet tray on which a sheet of paper 300 having a reading target image is placed. Here, the upper cover 260 is opened, the sheet of paper 300 having the reading target image is placed on the transparent glass 250 such that the surface thereof faces the lower side of FIG. 1, and then the upper cover 260 is closed, whereby it is possible to hold the sheet of paper 300 from the top. In the stationary reading mode, in this state, the sheet of paper 300 on the transparent glass 250 is irradiated while the first carriage 210 is moved, whereby the image on the sheet of paper 300 is read. When the first carriage 210 is moved, the second carriage 220 is also moved at a half of the speed of the first carriage 210 in the same direction such that the optical path length is kept constant until the light reflected from the sheet of paper reaches the CCD line sensor 240.

The image forming section 100 includes: image forming units 1K, 1C, 1M, and 1Y that form images with respective colors of black (K), cyan (C), magenta (M), and yellow (Y); and an exposure section 5 that emits laser light. The image forming units 1K, 1C, 1M, and 1Y respectively include electrophotographic laminated-type developer holding members 11K, 11C, 11M, and 11Y that are rotated in the respective directions of the arrow Bk, the arrow Bc, the arrow Bm, and the arrow By of FIG. 1. Here, each image forming unit is provided with not only the above-mentioned developer holding member but also a charger and a developer unit which are not shown in the drawing. The developer holding member in each image forming unit is charged by the charger not shown in the drawing such that the electric potential of the surface thereof reaches a predetermined electric potential, and the exposure section 5 performs raster scanning on the charged developer holding member with the laser light in a direction along each rotational shaft of the rotating developer holding members 11K, 11C, 11M, and 11Y. Thereby, an electrostatic latent image based on electric potential distribution is formed on the developer holding member. The toner in the developer, which contains the charged toner, is attached onto the electrostatic latent image by the developer unit not shown in the drawing, and the electrostatic latent image is developed. Thereby, the image developed by the toner is formed on the developer holding member.

Further, an intermediate transfer belt 2, which is moved in the direction of the arrow A of FIG. 1 in contact with the respective developer holding members, is provided on the lower sides of the respective image forming units 1 of FIG. 1. The respective primary transfer rollers 110K, 110C, 110M, and 110Y are provided at positions at which the rollers face the respective developer holding members 11K, 11C, 11M, and 11Y with the intermediate transfer belt 2 interposed therebetween. The intermediate transfer belt 2 is subjected to transfer (primary transfer) of the developed images formed on the respective developer holding members, and carries the primary transfer images.

In addition to the image forming units 1K, 1C, 1M, and 1Y, the intermediate transfer belt 2, and the exposure section 5 mentioned above, the image forming section 100 further includes: a secondary transfer roller 3a that secondarily transfers the primary transfer images on the intermediate transfer belt 2 onto the sheet of paper; and a fixing unit 4 that fixes the unfixed secondary transfer images, which are transferred onto the sheet of paper, onto the sheet of paper. Further, a sensor 2a, which detects the respective color test images formed by the respective image forming units and transferred onto the intermediate transfer belt 2 at the time of adjusting the relative positions and magnifications among the primary transfer images from the respective developer holding members, is provided in the vicinity of the intermediate transfer belt 2. In the adjustment of the relative positions and the magnifications, the sensor 2a detects the respective color test images, which are transferred onto the intermediate transfer belt 2, and adjusts the image forming units 1K, 1C, 1M, and 1Y such that the relative positions and magnifications among the respective color test images are set to appropriate positions and magnifications on the basis of the detection results.

Further, the image forming section 100 also includes: three trays of a first tray 70A, a second tray 70B, and a third tray 70C that respectively houses the sheets of paper; and a driving roller 30 that drives the intermediate transfer belt 2. The intermediate transfer belt 2 is circulated in the direction of the arrow A of FIG. 1 by the driving force which is applied from the driving roller 30 in a state where the belt is stretched by the driving roller 30 and other plural rollers. The intermediate transfer belt 2 is tightly pressed by the backup roller 3b toward the secondary transfer roller 3a. The primary transfer images on the intermediate transfer belt 2 are secondarily transferred onto the sheet of paper which is drawn from any one of the first tray 70A, the second tray 70B, and the third tray 70C by the operation of the secondary transfer roller 3a and is transported to the secondary transfer roller 3a. The sheet of paper subjected to the secondary transfer is further transported, the secondary transfer images on the sheet of paper are fixed onto the sheet of paper by the fixing unit 4, and the sheet is discharged onto the sheet discharging tray 10. Here, a cleaning device 2b is provided in the vicinity of the intermediate transfer belt 2, and the toner, which remains on the intermediate transfer belt 2 after the secondary transfer onto the sheet of paper, is removed by the cleaning device 2b. Further, the above-mentioned respective color test images on the intermediate transfer belt 2, which are formed at the time of adjusting the relative positions and magnifications among the primary transfer images from the respective developer holding members, are not secondarily transferred by the secondary transfer roller 3a but removed by the cleaning device 2b.

The image forming apparatus 10 is provided with a controller 6 that controls the respective sections in the image forming section 100. The controller 6 includes a readout image memory 64 that stores the image data which is generated by the CCD line sensor 240 of the above-mentioned image reading section 200. Further, in the image forming apparatus 10, errors in the dimensions/positions of the image forming units 1K, 1C, 1M, and 1Y and transport of the sheet of paper and the like cause deviation in the image formation position on the sheet of paper and change in image magnification. Therefore, as described later in detail, in the image forming apparatus 10, the chart images are formed on a sheet of paper, and the chart images on the sheet of paper are read by the image reading section 200, thereby calculating various correction amounts such as the correction amount of the image formation position relative to the sheet of paper and the correction amount of the magnification of the image on the sheet of paper. Hence, the controller 6 includes not only the above-mentioned readout image memory 64 but also a chart image memory 65 that stores the chart image data which represents the chart images used in calculation of the correction amounts to be described later. Further, the controller 6 may include a first tray memory 61, a second tray memory 62, and a third tray memory 63 that store the calculated correction amounts. The memories correspond to the first tray 70A, the second tray 70B, and the third tray 70C mentioned above, respectively. The reason why the memories storing the correction amounts are provided to correspond to the trays as described above is that a degree of deviation in the image formation position on the sheet of paper and a degree of change in image magnification become different in accordance with the path in which the sheet of paper is drawn from the tray. Here, each of the trays 70A, 70B, and 70C is configured such that the size of the sheet of paper to be contained therein is set in advance. Even when the power supply is turned on/off, the previous setting is still valid unless the setting is made again. It should be noted that the exemplary embodiment of the invention may have a configuration in which the size is automatically sensed.

In order to form the image based on the image data stored in the readout image memory 64 on the sheet of paper, the controller 6 reads the correction amounts from the memory corresponding to the tray designated by an user's operation through the operational section 270, performs various correction processes such as a process of correcting the image formation position and a process of correcting the image magnification on the image data which is stored in the readout image memory 64 on the basis of the read correction amounts, and causes the above-mentioned exposure section 5 to form electrostatic latent images based on the image data subjected to the correction processes. Here, the correction amounts are constituted of two-type correction amounts of correction amounts for the front surface at the time of image formation on the front surface in the duplex output and correction amounts for the back surface at the time of image formation on the back surface in the duplex output. In the image formation performed when the duplex output is set, the correction process is performed on the image data, which represents the image on the front surface as a surface subjected to the first output of the image between the both surfaces of the sheet of paper, on the basis of the correction amounts for the front surface, and the correction process is performed on the image data, which represents the image on the back surface as a surface subjected to the second output of the image, on the basis of the correction amounts for the back surface. In contrast, in the image formation performed when the simplex output is set, the correction process is performed on the image data, on the basis of the correction amounts for the front surface.

Next, a sequence of operations including the image reading and image formation on the sheet of paper in the image forming apparatus 10 will be described. Here, the case of employing the stationary reading mode will be exemplified.

A user places the sheet of paper between the transparent glass 250 and the upper cover 260 such that the surface having the reading target image faces the lower side of FIG. 1. In this state, the user designates the tray for containing the sheet of paper used in image formation, selects the duplex/simplex output, designates the number of output sheets through the operational section 270, and presses the start button (not shown in the drawing) which issues an instruction to start image reading and image formation in the button group 2702. Then, light is emitted from the lamp 211 in the first carriage 210, and the light emitted by the lamp passes through the transparent glass 250 and is reflected on the sheet of paper 300. Subsequently, the reflected light passes the first mirror 212 of the first carriage 210 and the second mirror 221 and the third mirror 222 of the second carriage 220, and is imaged on the CCD line sensor 240 by the lens section 230. In FIG. 1, the path of the light is indicated by the dotted line arrow in the image reading section 200. The first carriage 210 is moved in the direction (sub-scanning direction) of the solid line arrow in the image reading section 200 while such irradiation of light is performed by the lamp, and the second carriage 220 is also moved in the same direction at a half of the movement speed of the first carriage 210. Thereby, when the entire image on the sheet of paper 300 is irradiated, the light reflected from any portion of the image is imaged on the CCD line sensor 240 in a state where the optical path length thereof is kept constant. In such a manner, the image data based on the reflected light of the entire image is generated by the CCD line sensor 240. Each generated image data is subjected to various signal processes such as analog/digital conversion by a processing circuit not shown in the drawing, thereafter sent to the controller 6, and stored in the readout image memory 64 in the controller 6. Whenever a user places the opposite surface of the sheet of paper 300 or a surface of a new sheet of paper having a new image on the transparent glass 250 and presses the start button, such generation of the image data and storage of the image data in the readout image memory 64 are repeated.

The controller 6 reads the correction amounts from the memory, which corresponds to the designated tray, among the first tray memory 61, the second tray memory 62, and the third tray memory 63, and performs various correction processes, such as a process of correcting the image formation position and a process of correcting the image magnification, on the image data which is stored in the readout image memory 64 on the basis of the read correction amounts. Then, the controller 6 causes the exposure section 5 to form electrostatic latent images, which are based on the image data subjected to the correction processes, on the charged developer holding members 11K, 11C, 11M, and 11Y. Each formed electrostatic latent image is developed with the toner in the developer including a color toner corresponding to each image forming unit by the developer unit in each image forming unit, thereby forming a developed image with each color. The developed images with the respective colors, which are formed by the respective image forming unit in such a manner, are sequentially transferred (primarily transferred) onto and overlapped on the intermediate transfer belt 2 at the primary transfer rollers 110K, 110C, 110M, and 110Y corresponding to the respective developer holding members, thereby forming a multi-color primary transfer image. Subsequently, the multi-color primary transfer image is carried to the secondary transfer roller 3a by the intermediate transfer belt 2. Meanwhile, the sheet of paper in the designated tray among the first tray 70A, the second tray 70B, and the third tray 70C is drawn as the multi-color primary transfer image is formed, and is transported by a pair of first transport rollers 41a and a pair of second transport rollers 41b, and the posture of the sheet of paper is further correctly adjusted by a pair of alignment rollers 40. Further, at the timing when the primary transfer image on the intermediate transfer belt 2 reaches the position of the secondary transfer roller 3a, the sheet of paper is delivered by the pair of alignment rollers 40 so as to reach the position. Then, the above-mentioned multi-color primary transfer image is transferred (secondarily transferred) onto the delivered sheet of paper by the secondary transfer roller 3a. The sheet of paper subjected to the secondary transfer is further transported by a transport belt 31, and the fixing process is performed on the secondary transfer image on the sheet of paper by the fixing unit 4. In FIG. 1, the sheet transport path in this case is indicated by the dotted line arrow directed to the right in the image forming section 100. It should be noted that the toner, which remains on the intermediate transfer belt 2 after the secondary transfer onto the sheet of paper, is removed by the cleaning device 2b.

When the simplex output is selected, by passing the sheet of paper through the sheet transport path just once, the secondary transfer image is fixed in the fixing unit 4. Thereafter, the sheet passes the pair of delivery rollers 40a, and is directly discharged onto the sheet discharging tray 10a.

In contrast, when the duplex output is selected, by passing the sheet through the above-mentioned sheet transport path indicated by the arrow directed to the right, the secondary transfer image is transferred and fixed onto one surface of the sheet of paper. Thereafter, the sheet is not transported toward the pair of delivery rollers 40a but transported to the lower side through the path, which is indicated by the dotted line arrow directed to the lower side, through a pair of first duplex transport rollers 40b. Subsequently, the transport direction of the sheet of paper is changed to the upward direction by reversing the rotation direction of a pair of second duplex transport rollers 40c, and the sheet passes a pair of third duplex transport rollers 40d and a pair of fourth duplex transport rollers 40e through the path indicated by the dotted line arrow directed to the left, passes the pair of first transport rollers 41a, the pair of second transport rollers 41b, and the pair of alignment rollers 40, and is transported again toward the secondary transfer roller 3a. Here, during the time from when the sheet of paper is subjected to the transfer by the secondary transfer roller 3a for the first time to when the sheet reaches the position of the secondary transfer roller 3a again, a new multi-color primary transfer image is formed on the intermediate transfer belt 2 in the same manner mentioned above. Then, when the sheet of paper reaches the secondary transfer roller 3a for the second time, the new multi-color primary transfer image is secondarily transferred onto the surface opposite the surface of the sheet of paper which is subjected to the secondary transfer for the first time. Subsequently, when a fixing process is performed on the new secondary transfer image on the opposite surface by the fixing unit 4, the sheet of paper, of which both surfaces has the fixed images formed thereon, is discharged onto the sheet discharging tray 10a. Here, the toner, which remains on the intermediate transfer belt 2 after the secondary transfer onto the opposite surface of the sheet of paper, is removed by the cleaning device 2b.

The above description is pertaining to the operation of the image forming apparatus 10. In the image forming apparatus 10, the image, which is read in the above-mentioned manner, is formed on the sheet of paper.

The above description is given of the exemplary case of employing the stationary reading mode. However, in the case of employing the transport reading mode, the image reading and image formation are the same as described above except that the image on the sheet of paper being transported is read by the first carriage 210 which is stationary.

In addition, in the above description, by correcting the image formation position in the sheet of paper, the process of correcting the image formation position is performed on the image data. However, in the exemplary embodiment of the invention, instead of such a correction process for image data, correction of the image formation position in the sheet of paper may be performed. For example, regarding correction of the position of the entire image in the sheet transport direction in the sheet of paper, the correction may be performed by controlling the pair of alignment rollers 40 so as to change the timing for delivering the sheet of paper toward the secondary transfer roller 3a. Further, regarding correction of the position of the entire image in the direction perpendicular to the sheet transport direction in the sheet of paper, the correction may be performed by controlling the exposure section 5 so as to change the write position of the electrostatic latent image on each developer holding member in the direction perpendicular to the sheet transport direction (the rotation shaft direction of each developer holding member).

Here, in the image forming apparatus 10, in some cases, an image may be formed on the sheet of paper of which the size is larger than the readable size of the image reading section 200. Generally, the readable range of the image reading section 200 coincides with the area of the transparent glass 250 (that is, the area of the sheet tray). As described above, even when an image is output onto the sheet of paper of which the size is larger than the area of the transparent glass 250 (that is, the area of the sheet tray), in a similar manner to the case of outputting an image onto the sheet of paper of which the size is smaller than the area of the transparent glass 250, it is preferable to precisely output an image with a predetermined size (magnification) at a predetermined position in the sheet of paper.

Hereinafter, a description will be given of calculation of the correction amounts such as the magnification and the image position of the image formed on the sheet of paper.

In the image forming apparatus 10, by using the image forming unit 1K for black (K), the calculation of the correction amounts such as the magnification and the image position described below is performed. In addition, the correction amounts in a case of using image forming units for the other respective colors of cyan (C), magenta (M), and yellow (Y) may be obtained from the calculated correction amounts by using the image forming unit 1K for black (K) through adjustment of the above-mentioned relative positions and magnifications among the primary transfer images which are formed by the respective four-color image forming units including the image forming unit 1K for black (K).

In the image forming apparatus 10, by pressing the correction amount calculation mode button 2702a in the operational section 270 of FIG. 1, the mode for calculating the correction amounts is set in the image forming apparatus 10. Here, in the image forming apparatus 10, the correction amount calculation is performed for each size of the sheet of paper. Thus, whenever the correction amount calculation mode button 2702a is pressed, the correction amount calculation mode is changed to a mode corresponding to each size of the sheets of paper. In addition, in the image forming apparatus 10, unless the correction amount calculation mode button 2702a is pressed, a normal mode for performing the image reading and image formation in the above-mentioned way is set. The normal mode is a default mode used when power is applied to the image forming apparatus 10.

Here, the image forming apparatus 10 is contrived to be able to calculate the correction amounts for the magnification of the image, the formation position of the image, and the like on the sheet of paper of which the size is larger than the area of the transparent glass 250 (the area of the sheet tray). Hereinafter, the contrivance will be described. In the following description, the sheet of paper, of which the size is larger than the area of the transparent glass 250, is referred to as a "large-size sheet of paper". For the sake of simplicity, it is assumed that the area of the transparent glass 250 is larger than a half of the size of the large-size sheet of paper, but smaller than that of the large-size sheet of paper. Further, it is assumed that the large-size sheets of paper are contained in the first tray 70A of FIG. 1, and the sheets of paper with sizes smaller than the large size are contained in the second tray 70B and the third tray 70C. Under the assumption, a description will be given of a case of calculating the correction amounts by using the large-size sheets of paper in the first tray 70A.

As described above, in the image forming apparatus 10, the correction amount calculation is performed for each size of the sheet of paper. Thus, whenever the correction amount calculation mode button 2702a is pressed, the correction amount calculation mode is changed to a mode corresponding to each size of the sheets of paper. Here, in the image forming apparatus 10, by pressing the correction amount calculation mode button 2702a in the operational section 270 of FIG. 1 a predetermined number of times, the mode for calculating the correction amounts for the formation position of the image on the large-size sheet of paper is set in the image forming apparatus 10.

Figure 2:
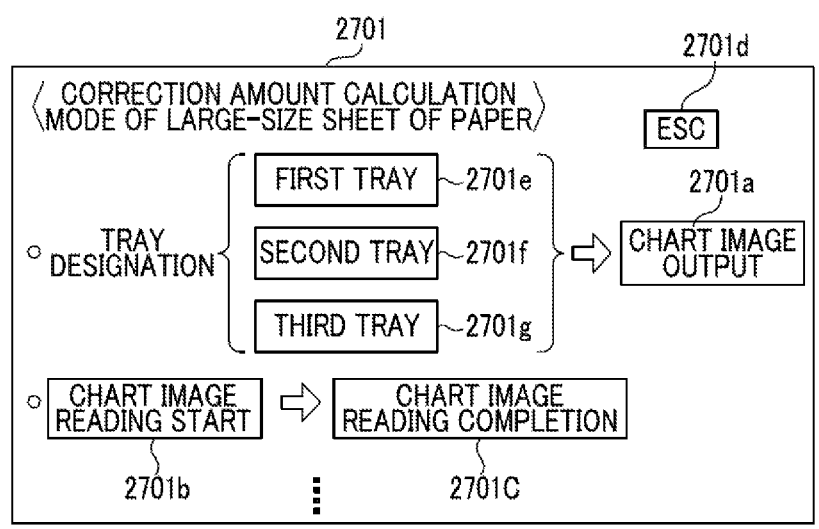
FIG. 2 is a diagram illustrating a picture which is displayed on a display screen of FIG. 1.

FIG. 2 is a diagram illustrating a picture which is displayed on the touch panel type display screen 2701 of FIG. 1 when the mode for calculating the correction amounts for the magnification of the image, the formation position of the image, or the like on the large-size sheet of paper is set.

The following fields, which may be selected by a touch of a user's finger, are displayed on the screen: three tray fields of a first tray field 2701e, a second tray field 2701f, and a third tray field 2701g each of which is for designating the sheet of paper, onto which chart images are output, through designation of the tray that contains the sheet of paper; a chart image output field 2701a for issuing an instruction to output the chart images; a reading start field 2701b for delivering, to the image forming apparatus 10, the effect of the current instruction of a user to cause the image forming apparatus 10 to read the chart image; a reading completion field 2701c for delivering, to the image forming apparatus 10, the effect that the user completes the work to cause the image forming apparatus 10 to read the chart image; and an ESC field 2701d for recovering the normal mode from the correction amount calculation mode. Here, in the mode for calculating the correction amounts for the large-size sheet of paper, only the tray field, corresponding to the tray that contains the large-size sheets of paper, is selectable, and the tray fields, corresponding to the trays that do not contain the large-size sheets of paper, are not selectable. In this drawing, the circumferences of the second tray field 2701f and the third tray field 2701g, respectively corresponding to the second tray 70B and the third tray 70C that do not contain the large-size sheets of paper, are indicated by the dotted lines, and the dotted lines indicate that the fields are not selectable even when touched by a user's finger.

The first tray field 2701e, which corresponds to the first tray 70A of FIG. 1 that contains the large-size sheets of paper, is touched by a user's finger in order to calculate the correction amounts for the large-size sheet of paper, and then the chart image output field 2701a is touched by the user's finger in order to output the chart image. By touching the first tray field 2701e with the user's finger, it is determined to use the correction amounts stored in the first tray memory 61 of FIG. 1 as correction amounts used at the time of outputting the chart image. By touching the chart image output field 2701a with the user's finger, in the image forming section 100 of FIG. 1, chart image data representing the chart images is read from the chart image memory 65 of FIG. 1, and the correction processes for the image formation position, the image magnification, and the like are performed on the basis of the correction amounts stored in the first tray memory 61 at this time. Then, on the basis of the chart image data after the correction process, the chart images are output onto both surfaces of the large-size sheet of paper. The image formation at this time is the same as image formation at the time of selecting the duplex output as described above.

FIG. 3 is a diagram illustrating the output chart images.

FIG. 3 shows a front surface 501A and a back surface 501B of the large-size sheet of paper 400 having the chart images. Here, the back surface 501B is a surface which is shown when the front surface 501A is rotated by 180 degrees about the lengthwise direction of the large-size sheet of paper as a rotation axis.

As shown in FIG. 3, six lines of an upper horizontal line 601, a center horizontal line 602, a lower horizontal line 603, a left vertical line 604, a center vertical line 605, and a right vertical line 606 are printed on either one of the front surface 501A and the back surface 501B of the large-size sheet of paper 400. The lines are an image for detecting information of the image such as the image formation position.

Further, when the large-size sheet of paper 400 is placed on the transparent glass 250 of FIG. 1 and is read, alignment images 801A, 802A, 803A, and 804A used for alignment of the sheet of paper are printed on the front surface 501A and the back surface 501B of the large-size sheet of paper 400. Roles of these eight alignment images 801A, 802A, 803A, and 804A will be described later in detail.

As described later, in order to read the front surface 501A and the back surface 501B of the large-size sheet of paper 400, the upper side part and the lower side part of the front surface 501A and the upper side part and the lower side part of the back surface 501B are divisionally read. Corresponding to the reading, four identification images 801, 802, 803, and 804 for respectively identifying the upper side part of the front surface 501A, the lower side part of the front surface 501A, the upper side part of the back surface 501B, and the lower side part of the back surface 501B are printed on the front surface 501A and the back surface 501B of the large-size sheet of paper. Further, the four identification images 801, 802, 803, and 804 include not only identification information for such identification but also information which specifies the tray (the first tray 70A of FIG. 1 in the example of the description) from which the large-size sheet of paper 400 is drawn.

The chart images, which are used in the image forming apparatus 10 according to the first exemplary embodiment, includes: detection images that are formed of six lines 601, 602, 603, 604, 605, and 606 which are set on each of the front surface 501A and the back surface 501B as described above; four alignment images 801A, 802A, 803A, and 804A that are set on each of the front surface 501A and the back surface 501B; and four identification images of two identification images 801 and 802 on the front surface 501A and two identification images 803 and 804 on the back surface 501B.

Here, in the chart image, the combined image of the detection image, which is formed of the six lines 601, 602, 603, 604, 605, and 606 on the front surface 501A, and the two identification images 801 and 802 on the front surface 501A corresponds to an example of the measurement image for measuring the position according to the exemplary embodiment of the invention. In addition, the four alignment images 801A, 802A, 803A, and 804A on the back surface 501B correspond to the designation image for designating the position according to the exemplary embodiment of the invention relative to the example of the measurement image for measuring the position. Further, in the chart image, the combined image of the detection image, which is formed of the six lines 601, 602, 603, 604, 605, and 606 on the back surface 501B, and the two identification images 803 and 804 on the back surface 501B corresponds to an example of the separate measurement image for measuring the position according to the exemplary embodiment of the invention. In addition, the four alignment images 801A, 802A, 803A, and 804A on the front surface 501A correspond to the designation image for designating the position according to the exemplary embodiment of the invention relative to the example of the separate measurement image for measuring the position.

When the chart images are output, then the output chart image reading is performed. In the reading of the output chart images, first the reading start field 2701b of FIG. 2 is touched by a user's finger, and thereby the effect of the current instruction of a user to cause the image forming apparatus 10 to read the chart images is delivered to the image forming apparatus 10. Then, the chart images are read in the order described below.

Figure 4A:
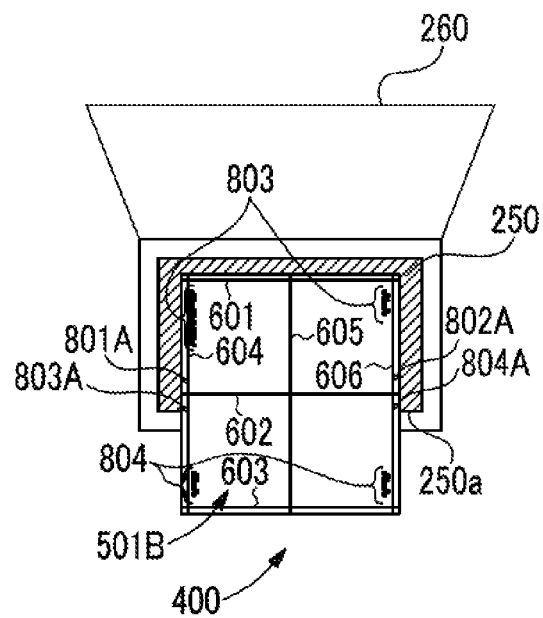
FIGS. 4A to 4C are diagrams illustrating a situation in which a large-size sheet of paper having chart images is placed between a transparent glass and an upper cover of FIG. 1 when the sheet of paper is read.
Figure 4B:
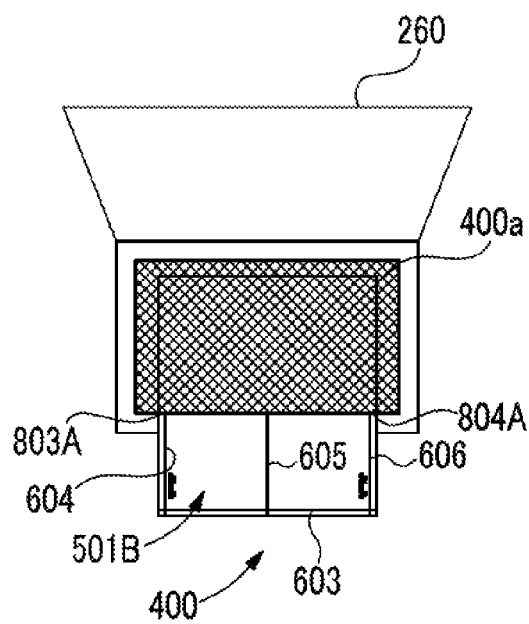
Figure 4C:
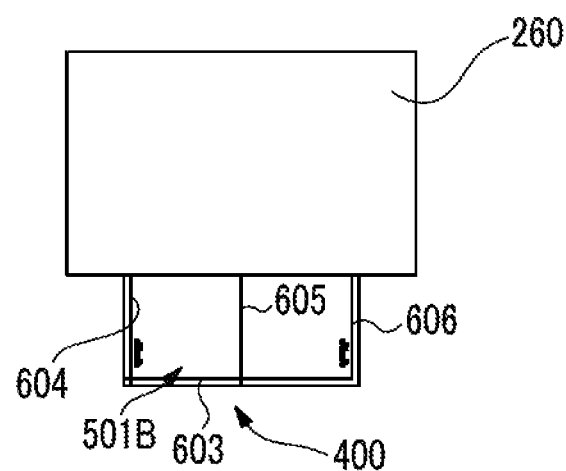

FIGS. 4A to 4C are diagrams illustrating a situation in which the large-size sheet of paper 400 having chart images is placed between the transparent glass 250 and the upper cover 260 of FIG. 1 when the sheet of paper is read.

Here, a description will be given of an exemplary case where the large-size sheet of paper 400 of FIG. 3 is placed such that the upper side part of the front surface 501A thereof faces the transparent glass 250 side and the upper side part of the back surface 501B thereof faces the upper cover 260 side in order to read the upper side part of the front surface 501A thereof.

First, as shown in FIG. 4A, the large-size sheet of paper 400 of FIG. 3 is placed on the transparent glass 250 (that is, a platen) such that the upper side part of the front surface 501A of the large-size sheet of paper 400 faces the transparent glass 250 side. In the case of the placement, the two alignment images 803A and 804A on the lower side of the drawing are aligned with the lower side edge 250a of the transparent glass 250 such that the vertex in a direction farther from a center vertical line 605 in each substantially triangular mark of the two alignment images 803A and 804A on the lower side of the drawing among the alignment images 801A, 802A, 803A, and 804A on the back surface 501B is on the line of the lower side edge 250a of the transparent glass 250 as shown in FIG. 4A. Thereby, the large-size sheet of paper 400 is aligned with the transparent glass 250 (that is, the platen) in the vertical direction of the drawing.

Next, as shown in FIG. 4B, the black sheet of paper 400a, of which both entire surfaces are solid black, is placed on the upper side part of the back surface 501B of the large-size sheet of paper 400 on the transparent glass 250. Thereby, the upper side part is completely covered by the black sheet of paper 400a. The black sheet of paper 400a is for providing a black background to the large-size sheet of paper 400 such that the edge portion of the large-size sheet of paper 400 is clearly recognized through the reading. That is, the black sheet of paper 400a covers at least a part of the space between the end portion of the transparent glass 250 and the large-size sheet of paper 400. The black sheet of paper 400a is one type of a background member as an example of the cover plate.

Subsequently, as shown in FIG. 4C, the upper cover 260 covers the top of the black sheet of paper 400a and the upper side part of the back surface 501B of the large-size sheet of paper 400, and reading is performed by the image reading section 200 of FIG. 1 in this state. The operation of the image reading section 200 at this time is the same as that in the above description of FIG. 1, and the readout data, which represents a part of the read chart images, is stored in the readout image memory 64. However, contrary to the normal mode, in a situation in which the correction amount calculation mode is set, image formation based on the readout data is not performed.

Next, reading is performed on the lower side part of the front surface 501A of the large-size sheet of paper 400 in the above-mentioned order, and reading is further performed on each of the upper and lower side parts (refer to FIG. 3) of the back surface 501B. Here, in order to read the lower side part of the front surface 501A, when the lower side part of the front surface 501A is intended to be placed on the transparent glass 250, the two alignment images 801A and 802A on the upper side of the back surface 501B are aligned with the lower side edge 250a of the transparent glass 250. Likewise, in the reading performed on the upper side part of the back surface 501B, the two alignment images 803A and 804A on the lower side of the front surface 501A are aligned with the lower side edge 250a of the transparent glass 250. In the reading performed on the lower side part of the back surface 501B, the two alignment images 801A and 802A on the upper side of the front surface 501A are aligned with the lower side edge 250a of the transparent glass 250. As described above, in either of the reading operations, by using the alignment images 801A and 802A or the alignment images 803A and 804A, the large-size sheet of paper 400 is aligned with the transparent glass 250 (that is, the platen) in the vertical direction of the drawing.

As described above, the readout data is generated for each of the upper and lower side parts of the front surface 501A and the upper and lower side parts of the back surface 501B, and is stored in the readout image memory 64.

FIG. 5 is a diagram illustrating a situation in which the reading regions of the upper and lower side parts of the front surface 501A of FIG. 3 and the reading regions of the upper and lower side parts of the back surface 501B of FIG. 3 for respective reading operations are overlapped on the front surface 501A and the back surface 501B of FIG. 3.

In FIG. 5, when the respective upper side parts and the respective lower side parts of the front surface 501A and the back surface 501B of the large-size sheet of paper 400 are placed in accordance with the placing method described in FIGS. 4A to 4C and are sequentially read, the respective reading regions are shown as four reading regions of a first reading region 701, a second reading region 702, a third reading region 703, and a fourth reading region 704 indicated by the dotted line. Thus, the area of each reading region corresponds to the area of the transparent glass 250 (that is, the area of the platen).

As shown in FIG. 5, the first reading region 701 and the second reading region 702 on the front surface 501A are overlapped with each other in a region in the vicinity of the center horizontal line 602. Thus, each of the readout data, which represents the upper side part of the front surface 501A of the first large-size sheet of paper 400 within the first reading region 701, and the readout data, which represents the lower side part thereof within the second reading region 702, includes the position information of the center horizontal line 602. This point is the same in the back surface 501B. Thus, the position information of the center horizontal line 602 is common between the readout data, which represents the upper side part thereof within the third reading region 703, and the readout data which represents the lower side part thereof within the fourth reading region 704.

When the respective reading operations of the upper and lower side parts of the front surface 501A and the upper and lower side parts of the back surface 501B are completed and the respective readout data pieces are stored in the readout image memory 64, the reading completion field 2701c of FIG. 2 is touched by the user's finger. When the reading completion field 2701c is touched by the user's finger, the controller 6 of FIG. 1 extracts position parameters of the detection images, which are respectively represented by four readout data pieces, from the four (=2×2) readout data pieces which are stored in the readout image memory 64 by then and respectively correspond to the upper and lower side parts of the front surface 501A and the upper and lower side parts of the back surface 501B of the large-size sheet of paper 400 having the chart images. For example, the upper side part of the front surface 501A of FIG. 5 will be described in detail. First, in the readout image, the edges of the sheet of paper are detected by finding places in which the black part as a part of the black sheet of paper 400a of FIG. 4A is changed into the white part corresponding to the sheet of paper. On the basis of the detection, a position of a corner of the sheet of paper, which is one intersection point between the edges, is set as an origin point O (refer to the front surface 501A of FIG. 5). Next, the upper horizontal line 601, the center horizontal line 602, the left vertical line 604, the center vertical line 605, and the right vertical line 606 are respectively detected, thereby calculating the respective coordinates of the six intersection points $A_1, A_2, A_3, A_4, A_5,$ and $A_6$. The coordinate values of the six coordinates are position parameters of the above-mentioned detection image. The same method is applied to each of the lower side part of the front surface 501A and the upper and lower side parts of the back surface 501B, thereby extracting the position parameters formed of the coordinate values of the six coordinates.

Next, the controller 6 of FIG. 1 calculates the various kinds of position information such as a distance between the upper horizontal line 601 and the lower horizontal line 603, a distance between the left vertical line 604 and the right vertical line 606, a distance between the upper side edge and the upper horizontal line 601, and a distance between the left side edge and the left vertical line 604, in each chart image (refer to FIG. 5) of the front surface 501A and the back surface 501B.

For example, the distance between the upper horizontal line 601 and the lower horizontal line 603 on the front surface 501A is calculated in the following manner. First, by finding data which represents an identification image 801 of FIG. 3 specifying the upper part of the front surface 501A, the readout data of the upper part of the front surface 501A is specified among the four readout data pieces. On the basis of the specified readout data of the upper part of the front surface 501A, the distance from the coordinates of the intersection point $A_2$ between the upper horizontal line 601 and the center vertical line 605 to the coordinates of the intersection point $A_5$ between the center horizontal line 602 and the center vertical line 605 is calculated. Next, by finding data which represents an identification image 802 of FIG. 3 specifying the lower part of the front surface 501A, the readout data of the lower part of the front surface 501A is specified among the four readout data pieces. On the basis of the specified readout data of the lower part of the front surface 501A, similarly to the upper part, the distance from the coordinates of the intersection point between the lower horizontal line 603 and the center vertical line 605 to the coordinates of the intersection point between the center horizontal line 602 and the center vertical line 605 is calculated. Then, the distance between the upper horizontal line 601 and the lower horizontal line 603 is calculated as the sum of the distance calculated in the upper part and the distance calculated in the lower part.

Further, the distance between the left vertical line 604 and the right vertical line 606 on the front surface 501A is calculated in the following manner. On the basis of the readout data of the upper part of the front surface 501A specified as described above, first, the distance from the coordinates of the intersection point $A_4$ between the center horizontal line 602 and the left vertical line 604 to the coordinates of the intersection point $A_6$ between the center horizontal line 602 and the right vertical line 606 is calculated. Next, on the basis of the readout data of the lower part of the front surface 501A specified as described above, similarly to the upper part, the distance from the intersection point between the center horizontal line 602 and the left vertical line 604 to the coordinates of the intersection point between the center horizontal line 602 and the right vertical line 606 is calculated. Then, the distance between the left vertical line 604 and the right vertical line 606 on the front surface 501A is calculated as the average of the distance calculated in the upper part and the distance calculated in the lower part.

Further, the distance between the upper side edge and the upper horizontal line 601 and the distance between the left side edge and the left vertical line 604 on the front surface 501A are calculated as coordinate components, which are constituted of a coordinate component in a direction along the left vertical line 604 and a coordinate component in a direction along the upper horizontal line 601, belonging to the coordinates of the intersection point between the upper horizontal line 601 and the left vertical line 604, on the basis of the readout data of the upper part of the front surface 501A specified as described above.

Here, the distance between the upper horizontal line 601 and the lower horizontal line 603 determines the magnification of the chart image in the lengthwise direction of the sheet of paper of FIG. 5, and the distance between the left vertical line 604 and the right vertical line 606 determines the magnification of the chart image in the widthwise direction of the sheet of paper of FIG. 5. Further, the distance between the upper side edge and the upper horizontal line 601 and the distance between the left side edge and the left vertical line 604 determine the position of the chart image of the large-size sheet of paper. The controller 6 of FIG. 1 calculates the correction amounts of the image formation position and magnification necessary for appropriate values of two types of the magnification and the position of the chart image on the large-size sheet of paper.

The above-mentioned position information and the correction amounts of the back surface 501B are calculated in a similar manner as to the front surface 501A. Finally, the correction amounts for the front surface of the large-size sheet of paper and the correction amounts for the back surface thereof are calculated.

When the correction amounts are calculated, then the controller 6 of FIG. 1 specifies the tray (the first tray 70A of FIG. 1 in the example of the description), from which the large-size sheet of paper is drawn, on the basis of the identification image data, and causes the memory, which corresponds to the specified tray, to store the correction amounts (the correction amounts for the front surface and the correction amounts for the back surface). Here, when the correction amounts are stored, new correction amounts, which are calculated through the above-mentioned process, are rewritten onto the correction amounts which are originally stored in the memory.

The above description is given of calculation of the correction amounts for the image formation position and the like on the sheet of paper of which the size is larger than the area of the transparent glass 250 (the area of the sheet tray), in the image forming apparatus 10 according to the first exemplary embodiment.

As described above, in the chart image used in the image forming apparatus 10 according to the first exemplary embodiment, when the upper parts of the front surface 501A and the back surface 501B are intended to be placed on the transparent glass 250, the alignment images 803A and 804A on the lower side of the center horizontal line 602 of the back surface 501B and the front surface 501A are aligned with the lower side edge 250a of the transparent glass 250. In addition, when the lower parts of the front surface 501A and the back surface 501B are intended to be placed on the transparent glass 250, the alignment images 801A and 802A on the upper side of the center horizontal line 602 of the back surface 501B and the front surface 501A are aligned with the lower side edge 250a of the transparent glass 250. Thereby, any readout data reliably contains the position information of the center horizontal line 602, and the corners of the sheet of paper are separated from the edges of the transparent glass. As a result, when the respective upper side parts and the respective lower side parts of the front surface 501A and the back surface 501B are read, the image forming apparatus 10 according to the first exemplary embodiment is unlikely to cause a reading failure, in which the readout data not containing data of common portions (for example, the center horizontal line 602) is generated and thus it is difficult to calculate the correction amounts when a user makes an error in placing the large-size sheet of paper 400, and a reading failure in which it is difficult to sense the edge positions of the sheet of paper when the readout images are analyzed.

In particular, by using the edge 250a of the transparent glass 250 as a target, an additional target for alignment is not necessary, and it becomes easy to align the sheet of paper.

The above description is given of the first exemplary embodiment.

In addition, in the above description, reading is performed plural times by using the large-size sheet of paper. However, the exemplary embodiment of the invention is not limited to this, and may be applied to a configuration in which reading may be performed once.

Further, in the above description, the black sheet of paper is employed as the background member which is an example of the cover plate. However, the exemplary embodiment of the invention is not limited to this, and a color sheet of paper, which is not black, may also be used, and a sheet of paper, which has a specific shape or on which an image is formed, may also be used. Furthermore, the background member made of plastic or acryl other than paper may be used. The cover plate may be appropriately changed if it is able to detect the edges of the sheet of paper in the function necessary for the cover plate, that is, the sheet of paper and the cover plate only have to be separated.

Further, in a case where one sheet of paper is divided into plural regions and is divisionally read plural times, in order to prevent reading moiré, it may be also possible to form images for distinguishing the regions. Examples of the images for distinguishing the regions include, for example, characters, signs, and the like. Furthermore, even the same character or sign may be used as the images for distinguishing the regions by varying the densities or the number of images. In addition, such images may be used in combination with the alignment images.

Moreover, in order to provide a sequence of the respective reading operations of the plural regions, for example, the images may be formed as numbers or the like such that the sequence of the images for distinguishing the regions may be recognized.

Further, in the above description, the alignment images are aligned with the edge of the transparent glass 250. However, it is necessary for the alignment images to be able to position the sheet of paper such that the detection images (for example, the center horizontal line 602) as measurement targets are not out of the reading region and a space may be interposed between the end portion of the sheet of paper and the boundary of the reading region. It is more preferable that the alignment images be formed at the boundary position between images as targets formed on the background member or the upper cover.

Further, in the above description, the marks are used as the alignment images. However, in the exemplary embodiment of the invention, various identification shapes or identification signs such as lines other than the marks may be used. In addition, the alignment images for designating the range such that the sheet of paper is in the range may be used.

Second Exemplary Embodiment

Next, an image forming apparatus according to a second exemplary embodiment will be described.

The image forming apparatus according to the second exemplary embodiment is different from the image forming apparatus 10 according to the first exemplary embodiment shown in FIG. 1 in that chart image data, which is different from the chart image data stored in the chart image memory 65 of the image forming apparatus 10 according to the first exemplary embodiment, is stored in the chart image memory. Except the point described above, the configuration and the operation of the image forming apparatus according to the second exemplary embodiment are the same as those of the image forming apparatus 10 according to the first exemplary embodiment. Here, the chart images, which are represented by the chart image data, in the second exemplary embodiment is different from the chart images in the first exemplary embodiment shown in FIG. 3 only in that the chart images have different alignment images. Otherwise, the chart images are the same as the chart images in the first exemplary embodiment shown in FIG. 3. As described above, the chart images are different from those of the first exemplary embodiment, but in the image forming apparatus according to the second exemplary embodiment, the correction amounts are calculated in the same order as that of the image forming apparatus according to the first exemplary embodiment. The following description will be given focusing on the different point from the first exemplary embodiment, and a repeated description of the same components as the first exemplary embodiment will be omitted. Further, in the drawing, the components the same as those of the first exemplary embodiment are represented by the same reference numerals and signs.

Figure 6:
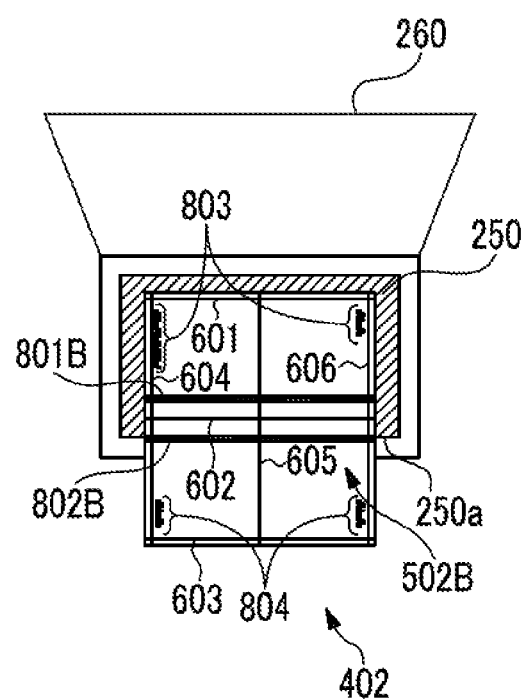
FIG. 6 is a diagram illustrating a situation in which the sheet of paper is aligned on the transparent glass when the large-size sheet of paper having the chart images is read in a second exemplary embodiment.

FIG. 6 is a diagram illustrating a situation in which a sheet of paper 402 is aligned on the transparent glass 250 when the large-size sheet of paper 402 having the chart images is read in the second exemplary embodiment.

FIG. 6 shows an exemplary case where the upper side part of the front surface is placed toward the transparent glass 250 side in order to read the upper side part of the front surface of the large-size sheet of paper 402. In this case, as shown in FIG. 6, a back surface 502B of the large-size sheet of paper 402 is visible from the outside. In the chart images on the large-size sheet of paper 402 of FIG. 6, the two alignment images 801A and 802A on the upper side of the center horizontal line 602 and the two alignment images 803A and 804A, which are represented by the substantially triangular marks, on the lower side thereof in the chart images on the large-size sheet of paper 400 of FIG. 3 are replaced by an alignment image 801B and an alignment image 802B. Here, the alignment image 801B is indicated by the single line extending in the horizontal direction on the upper side of the center horizontal line 602, and the alignment image 802B is indicated by the single line extending in the horizontal direction on the lower side of the center horizontal line 602. That is, although not shown in FIG. 6, the same alignment images 801B and 802B are printed on the front surface opposite to the back surface 502B of FIG. 6 together with the detection images which are formed of the six lines 601, 602, 603, 604, 605, and 606. Further, four identification images the same as those of FIG. 3 for identifying those with each other are printed on four parts of the upper and lower side parts of the back surface 502B and the upper and lower side parts of the front surface opposite thereto, respectively. In FIG. 6, among the images, only two identification images 803 and 804 on the back surface 502B are shown.

In order to read the upper side part of the front surface of the large-size sheet of paper 402, the upper side part of the front surface is placed on the transparent glass 250. In this case, the alignment image 802B on the lower side of the drawing is aligned with the lower side edge 250a of the transparent glass 250 such that the line of the alignment image 802B on the lower side of the drawing between the alignment images 801B and 802B on the back surface 502B is on the line of the lower side edge 250a of the transparent glass 250 as shown in FIG. 6. Thereby, the large-size sheet of paper 402 is aligned with the transparent glass 250 (that is, the platen) in the vertical direction of the drawing.

After the above-mentioned placement, in a similar manner to FIGS. 4B and 4C, reading is performed in a state where the sheet is covered by the upper cover 260 or the black sheet of paper 400a shown in FIG. 4B, and the readout data is generated.

Next, reading is performed on the lower side part of the front surface of the large-size sheet of paper 402 in the above-mentioned order, and reading is further performed on each of the upper and lower side parts of the back surface 502B. Here, in the case of reading the lower side part of the front surface, when the lower side part of the front surface is intended to be placed on the transparent glass 250, the alignment image 801B on the upper side of the back surface 502B is aligned with the lower side edge 250a of the transparent glass 250. In the case of reading the upper and lower side parts of the back surface 502B, in a similar manner to the back surface 501B, alignment is also performed by using the two alignment images on the front surface. As described above, in either of the reading operations, by using the alignment images 801B and 802B, the large-size sheet of paper 402 is aligned with the transparent glass 250 (that is, the platen) in the vertical direction of the drawing.

As described above, the readout data is generated for each of the upper and lower side parts of the front surface and the upper and lower side parts of the back surface 502B, and is stored in the readout image memory 64. The subsequent flow of the correction amount calculation is the same as that of the first exemplary embodiment, and thus a repeated description will be omitted.

In the second exemplary embodiment, in a similar manner to the first exemplary embodiment, any readout data reliably contains the position information of the center horizontal line 602, and the corners of the sheet of paper are separated from the edges of the transparent glass. As a result, when the respective upper side parts and the respective lower side parts of the front surface and the back surface are read, the image forming apparatus according to the second exemplary embodiment is unlikely to cause a reading failure, in which the readout data not containing data of common portions (for example, the center horizontal line 602) is generated and thus it is difficult to calculate the correction amounts when a user makes an error in placing the large-size sheet of paper 402, and a reading failure in which it is difficult to sense the edge positions of the sheet of paper when the readout images are analyzed.

Further, by using the edge 250a of the transparent glass 250 as a target, an additional target for alignment is not necessary, and thus it becomes easy to align the sheet of paper.

Third Exemplary Embodiment

Next, an image forming apparatus according to a third exemplary embodiment will be described.

The image forming apparatus according to the third exemplary embodiment is different from the image forming apparatus 10 according to the first exemplary embodiment shown in FIG. 1 in that chart image data, which is different from the chart image data stored in the chart image memory 65 of the image forming apparatus 10 according to the first exemplary embodiment, is stored in the chart image memory. Except the point described above, the configuration and the operation of the image forming apparatus according to the third exemplary embodiment are the same as those of the image forming apparatus 10 according to the first exemplary embodiment. Here, the chart images, which are represented by the chart image data, in the third exemplary embodiment is different from the chart images in the first exemplary embodiment shown in FIG. 3 only in that the chart images have different alignment images. Otherwise, the chart images are the same as the chart images in the first exemplary embodiment shown in FIG. 3. As described above, the chart images are different from those of the first exemplary embodiment, but in the image forming apparatus according to the third exemplary embodiment, the correction amounts are calculated in the same order as that of the image forming apparatus according to the first exemplary embodiment. The following description will be given focusing on the different point from the first exemplary embodiment, and a repeated description of the same components as the first exemplary embodiment will be omitted. Further, in the drawing, the components the same as those of the first exemplary embodiment are represented by the same reference numerals and signs.

Figure 7A:
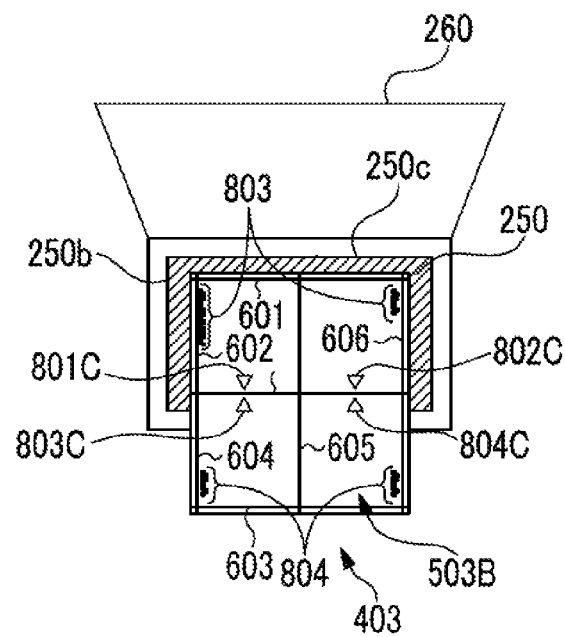
FIGS. 7A and 7B are diagrams illustrating a situation in which the sheet of paper is aligned on the transparent glass when the large-size sheet of paper having the chart images is read in a third exemplary embodiment.
Figure 7B:
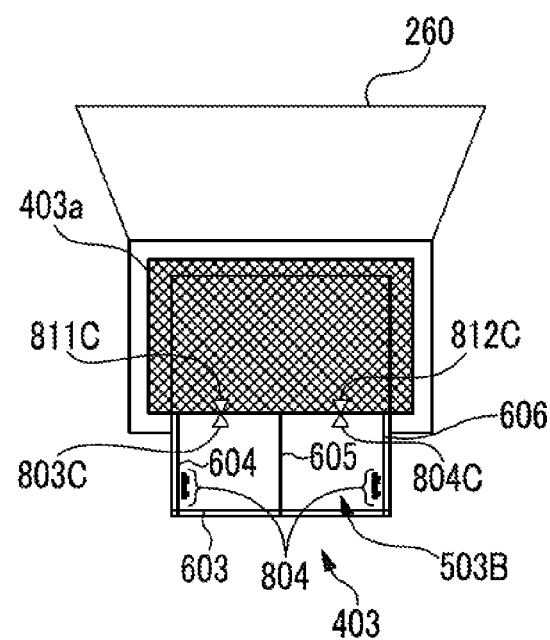

FIGS. 7A and 7B are diagrams illustrating a situation in which a sheet of paper 403 is aligned on the transparent glass 250 when the large-size sheet of paper 403 having the chart images is read in the third exemplary embodiment.

FIGS. 7A and 7B show an exemplary case where the upper side part of the front surface is placed toward the transparent glass 250 side in order to read the upper side part of the front surface of the large-size sheet of paper 403.

In this case, as shown in FIG. 7A, a back surface 503B of the large-size sheet of paper 403 is visible from the outside. In the chart images on the large-size sheet of paper 403 of FIG. 7A, the two alignment images 801A and 802A and the two alignment images 803A and 804A in the chart images on the large-size sheet of paper 400 of FIG. 3 are replaced by two alignment images 801C and 802C and two alignment images 803C and 804C. Here, the two alignment images 801A and 802A are respectively provided in the vicinities of the edges of the sheet of paper 400 on the upper side of the center horizontal line 602, and the two alignment images 803A and 804A are respectively provided in the vicinities of the edges of the sheet of paper 400 on the lower side of the center horizontal line 602, but the two alignment images 801C and 802C are respectively provided at positions close to the vertical line 605 on the upper side of the center horizontal line 602, and the two alignment images 803C and 804C are respectively provided at positions close to the vertical line 605 on the lower side of the center horizontal line 602. That is, although not shown in FIG. 7A, the same alignment images 801C, 802C, 803C, and 804C are printed on the front surface opposite to the back surface 503B of FIG. 7A together with the detection images which are formed of the six lines 601, 602, 603, 604, 605, and 606. Further, four identification images the same as those of FIG. 3 for identifying those with each other are printed on four parts of the upper and lower side parts of the back surface 503B and the upper and lower side parts of the front surface opposite thereto, respectively. In FIG. 7A, among the images, only two identification images 803 and 804 on the back surface 503B are shown.

Next, as shown in FIG. 7B, a black sheet of paper 403a is placed on the upper side part of the back surface 503B of the large-size sheet of paper 403 on the transparent glass 250. Thereby, the upper side part is completely covered by the black sheet of paper 403a. Here, similarly to the black sheet of paper 400a shown in FIG. 4B, the black sheet of paper 403a shown in FIG. 7B is for providing a black background to the large-size sheet of paper 403 such that the edge portion of the large-size sheet of paper 403 is clearly recognized through the reading. That is, the black sheet of paper 403a covers at least a part of the space between the end portion of the transparent glass 250 and the large-size sheet of paper 403. However, contrary to the black sheet of paper 400a shown in FIG. 4B, white target images 811C and 812C having substantially triangular shapes are printed on the black sheet of paper 403a shown in FIG. 7B in the vicinity of the edge of the surface opposite to the surface covering the upper side part of the back surface 503B of the sheet of paper 403, and both entire surfaces of the black sheet of paper 403a are solid black except for the target images 811C and 812C which are printed on one surface thereof. Here, the transparent glass 250 is formed to be slightly sunken compared with the surface around the transparent glass 250. Hence, there is a level difference between the edges of the transparent glass 250 and the periphery thereof. In a case of reading the chart images in the third exemplary embodiment, it is possible to bump the black sheet of paper 403a into both of an upper side edge 250c and a left side edge 250b of the transparent glass 250 with the level difference, and thereby the black sheet of paper 403a is aligned with the transparent glass 250. The two alignment images 803C and 804C on the lower side of the back surface 503B of FIG. 7A are aligned with the target images 811C and 812C of the black sheet of paper 403a, which is aligned as described above, as shown in FIG. 7B. Thereby, the large-size sheet of paper 403 is aligned with the transparent glass 250 (that is, the platen) in the vertical and horizontal directions of the drawing.

After the sheet is placed as described above, in a similar manner to FIG. 4C, reading is performed in a state where the sheet is covered by the upper cover 260, and the readout data is generated.

Next, reading is performed on the lower side part of the front surface of the large-size sheet of paper 403 in the above-mentioned order, and reading is further performed on each of the upper and lower side parts of the back surface 503B. Here, in the case of reading the lower side part of the front surface, when the lower side part of the front surface is intended to be placed on the transparent glass 250, the alignment images 801C and 802C on the upper side of the back surface 503B are aligned with the target images 811C and 812C of the black sheet of paper 403a aligned as described in FIG. 7B. In the case of reading the upper and lower side parts of the back surface 503B, in a similar manner to the back surface 503B, alignment is also performed by using the four alignment images on the front surface. As described above, in either of the reading operations, by using the alignment images 801C and 802C on the upper side or the alignment images 803C and 804C on the lower side, the large-size sheet of paper 403 is aligned with the transparent glass 250 (that is, the platen) in the vertical and horizontal directions of the drawing.

As described above, the readout data is generated for each of the upper and lower side parts of the front surface and the upper and lower side parts of the back surface 503B, and is stored in the readout image memory 64. The subsequent flow of the correction amount calculation is the same as that of the first exemplary embodiment, and thus a repeated description will be omitted.

In the third exemplary embodiment, in a similar manner to the first exemplary embodiment, any readout data reliably contains the position information of the center horizontal line 602, and the corners of the sheet of paper are separated from the edges of the transparent glass. As a result, when the respective upper side parts and the respective lower side parts of the front surface and the back surface are read, the image forming apparatus according to the third exemplary embodiment is unlikely to cause a reading failure, in which the readout data not containing data of common portions (for example, the center horizontal line 602) is generated and thus it is difficult to calculate the correction amounts when a user makes an error in placing the large-size sheet of paper 403, and a reading failure in which it is difficult to sense the edge positions of the sheet of paper when the readout images are analyzed.

Further, only by using the target images 811C and 812C of the aligned black sheet of paper 403a as targets, the sheet of paper may be aligned, and thus it becomes easy to align the sheet of paper.

In particular, in the third exemplary embodiment, the large-size sheet of paper 403 is aligned in the horizontal direction of the drawing. Hence, it is possible to prevent the large-size sheet of paper 403 from protruding out of the transparent glass 250 (that is, the platen) in the horizontal direction of the drawing.

Fourth Exemplary Embodiment

Next, an image forming apparatus according to a fourth exemplary embodiment will be described.

The image forming apparatus according to the fourth exemplary embodiment is different from the image forming apparatus 10 according to the first exemplary embodiment shown in FIG. 1 in that chart image data, which is different from the chart image data stored in the chart image memory 65 of the image forming apparatus 10 according to the first exemplary embodiment, is stored in the chart image memory. Except the point described above, the configuration and the operation of the image forming apparatus according to the fourth exemplary embodiment are the same as those of the image forming apparatus 10 according to the first exemplary embodiment. Here, the chart images, which are represented by the chart image data, in the fourth exemplary embodiment is different from the chart images in the first exemplary embodiment shown in FIG. 3 only in that the chart images have different alignment images. Otherwise, the chart images are the same as the chart images in the first exemplary embodiment shown in FIG. 3. As described above, the chart images are different from those of the first exemplary embodiment, but in the image forming apparatus according to the fourth exemplary embodiment, the correction amounts are calculated in the same order as that of the image forming apparatus according to the first exemplary embodiment. The following description will be given focusing on the different point from the first exemplary embodiment, and a repeated description of the same components as the first exemplary embodiment will be omitted. Further, in the drawing, the components the same as those of the first exemplary embodiment are represented by the same reference numerals and signs.

Figure 8A:
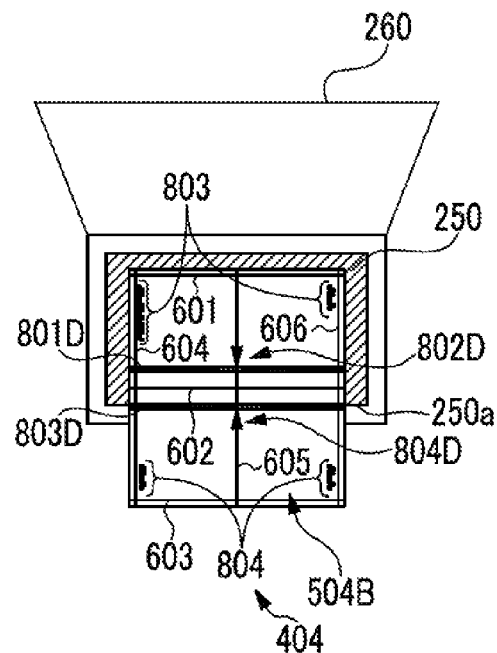
FIGS. 8A and 8B are diagrams illustrating a situation in which the sheet of paper is aligned on the transparent glass when the large-size sheet of paper having the chart images is read in a fourth exemplary embodiment.
Figure 8B:
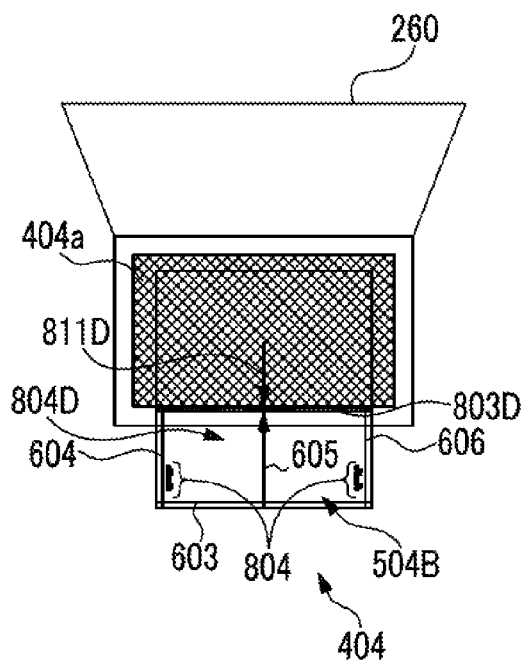

FIGS. 8A and 8B are diagrams illustrating a situation in which a sheet of paper 404 is aligned on the transparent glass 250 when the large-size sheet of paper 404 having the chart images is read in the fourth exemplary embodiment.

FIGS. 8A and 8B show an exemplary case where the upper side part of the front surface is placed toward the transparent glass 250 side in order to read the upper side part of the front surface of the large-size sheet of paper 404. In this case, as shown in FIG. 8A, a back surface 504B of the large-size sheet of paper 404 is visible from the outside. In the chart images on the large-size sheet of paper 404 of FIG. 8A, the two alignment images 801A and 802A on the upper side of the center horizontal line 602 and the two alignment images 803A and 804A on the lower side thereof, which are represented by the substantially triangular marks, in the chart images on the large-size sheet of paper 400 of FIG. 3 are replaced by alignment images 801D, 802D, 803D, and 804D. Here, the alignment image 801D, which has a shape like a single line extending in the horizontal direction, and the alignment image 802D, which has an arrow-like shape, are provided on the upper side of the center horizontal line 602. In addition, the alignment image 803D, which has a shape like a single line extending in the horizontal direction, and the alignment image 804D, which has an arrow-like shape, are provided on the lower side of the center horizontal line 602. That is, although not shown in FIGS. 8A and 8B, the same alignment images 801D, 802D, 803D, and 804D are printed on the front surface opposite to the back surface 504B of FIGS. 8A and 8B together with the detection images which are formed of the six lines 601, 602, 603, 604, 605, and 606. Further, four identification images the same as those of FIG. 3 for identifying those with each other are printed on four parts of the upper and lower side parts of the back surface 504B and the upper and lower side parts of the front surface opposite thereto, respectively. In FIG. 8A, among the images, only two identification images 803 and 804 on the back surface 504B are shown.

In order to read the upper side part of the front surface of the large-size sheet of paper 404, the upper side part of the front surface is placed on the transparent glass 250. In this case, the alignment image 803D on the lower side of the drawing is aligned with the lower side edge 250a of the transparent glass 250 such that the line of the alignment image 803D on the lower side of the drawing between the alignment images 801D and 803D having substantially linear shapes on the back surface 504B is on the line of the lower side edge 250a of the transparent glass 250 as shown in FIG. 8A. Thereby, the large-size sheet of paper 404 is aligned with the transparent glass 250 (that is, the platen) in the vertical direction of the drawing.

Next, as shown in FIG. 8B, a black sheet of paper 404a is placed on the upper side part of the back surface 504B of the large-size sheet of paper 404 on the transparent glass 250. Thereby, the upper side part is completely covered by the black sheet of paper 404a. Here, similarly to the black sheet of paper 400a shown in FIG. 4B, the black sheet of paper 404a shown in FIG. 8B is for providing a black background to the large-size sheet of paper 404 such that the edge portion of the large-size sheet of paper 404 is clearly recognized through the reading. That is, the black sheet of paper 404a covers at least a part of the space between the end portion of the transparent glass 250 and the large-size sheet of paper 404. However, contrary to the black sheet of paper 400a shown in FIG. 4B, a white target image 811D having an arrow-like shape is printed on the black sheet of paper 404a shown in FIG. 8B in the vicinity of the edge of the surface opposite to the surface covering the upper side part of the back surface 504B of the sheet of paper 404, and both entire surfaces of the black sheet of paper 404a are solid black except for the target image 811D which are printed on one surface thereof. Here, the transparent glass 250 is formed to be slightly sunken compared with the surface around the transparent glass 250. Hence, there is a level difference between the edges of the transparent glass 250 and the periphery thereof. In a case of reading the chart images in the fourth exemplary embodiment, it is possible to bump the black sheet of paper 404a into both of the upper side edge 250c and the left side edge 250b of the transparent glass 250 with the level difference, and thereby the black sheet of paper 404a is aligned with the transparent glass 250. The alignment image 804D having an arrow-like shape on the lower side of the back surface 504B of FIG. 8A is aligned with the target image 811D of the black sheet of paper 404a, which is aligned as described above, as shown in FIG. 8B. Thereby, the large-size sheet of paper 404 is aligned with the transparent glass 250 (that is, the platen) in the horizontal direction of the drawing.

After the sheet is placed as described above, in a similar manner to FIG. 4C, reading is performed in a state where the sheet is covered by the upper cover 260, and the readout data is generated.

Next, reading is performed on the lower side part of the front surface of the large-size sheet of paper 404 in the above-mentioned order, and the reading is further performed on each of the upper and lower side parts of the back surface 504B. Here, in the case of reading the lower side part of the front surface, when the lower side part of the front surface is intended to be placed on the transparent glass 250, the alignment images 801D and 802D on the upper side of the back surface 504B are respectively aligned with the lower side edge 250a of the transparent glass 250 described in FIG. 8A and the target image 811D of the black sheet of paper 404a aligned as described in FIG. 8B. In the case of reading the upper and lower side parts of the back surface 504B, in a similar manner to the back surface 504B, alignment is also performed by using the four alignment images on the front surface. As described above, in either of the reading operations, by using the alignment images 801D and 802D on the upper side or the alignment images 803D and 804D on the lower side, the large-size sheet of paper 404 is aligned with the transparent glass 250 (that is, the platen) in the vertical and horizontal directions of the drawing.

As described above, the readout data is generated for each of the upper and lower side parts of the front surface and the upper and lower side parts of the back surface 504B, and is stored in the readout image memory 64. The subsequent flow of the correction amount calculation is the same as that of the first exemplary embodiment, and thus a repeated description will be omitted.

In the fourth exemplary embodiment, in a similar manner to the first exemplary embodiment, any readout data reliably contains the position information of the center horizontal line 602, and the corners of the sheet of paper are separated from the edges of the transparent glass. As a result, when the respective upper side parts and the respective lower side parts of the front surface and the back surface are read, the image forming apparatus according to the fourth exemplary embodiment is unlikely to cause a reading failure, in which the readout data not containing data of common portions (for example, the center horizontal line 602) is generated and thus it is difficult to calculate the correction amounts when a user makes an error in placing the large-size sheet of paper 404, and a reading failure in which it is difficult to sense the edge positions of the sheet of paper when the readout images are analyzed.

Further, just by using the lower side edge 250a of the transparent glass 250 and the target image 811D of the aligned black sheet of paper 404a as targets, the sheet of paper may be aligned, and thus it becomes easy to align the sheet of paper.

In particular, in the fourth exemplary embodiment, the large-size sheet of paper 404 is aligned in the horizontal direction of the drawing. Hence, it is possible to prevent the large-size sheet of paper 404 from protruding out of the transparent glass 250 (that is, the platen) in the horizontal direction of the drawing.

Fifth Exemplary Embodiment

Next, an image forming apparatus according to a fifth exemplary embodiment will be described.

The image forming apparatus according to the fifth exemplary embodiment is different from the image forming apparatus 10 according to the first exemplary embodiment shown in FIG. 1 in that chart image data, which is different from the chart image data stored in the chart image memory 65 of the image forming apparatus 10 according to the first exemplary embodiment, is stored in the chart image memory and black image data representing a black image, which is output onto the black sheet of paper for providing a black background to the large-size sheet of paper 404, is stored in the chart image memory. Except the point described above, the configuration and the operation of the image forming apparatus according to the fifth exemplary embodiment are the same as those of the image forming apparatus 10 according to the first exemplary embodiment. Here, the chart images, which are represented by the chart image data, in the fifth exemplary embodiment is different from the chart images in the first exemplary embodiment shown in FIG. 3 only in that the chart images have different alignment images. Otherwise, the chart images are the same as the chart images in the first exemplary embodiment shown in FIG. 3. As described above, the chart images are different from those of the first exemplary embodiment, but in the image forming apparatus according to the fifth exemplary embodiment, the correction amounts are calculated in the same order as that of the image forming apparatus according to the first exemplary embodiment. The following description will be given focusing on the different point from the first exemplary embodiment, and a repeated description of the same components as the first exemplary embodiment will be omitted. Further, in the drawing, the components the same as those of the first exemplary embodiment are represented by the same reference numerals and signs.

Figure 9:
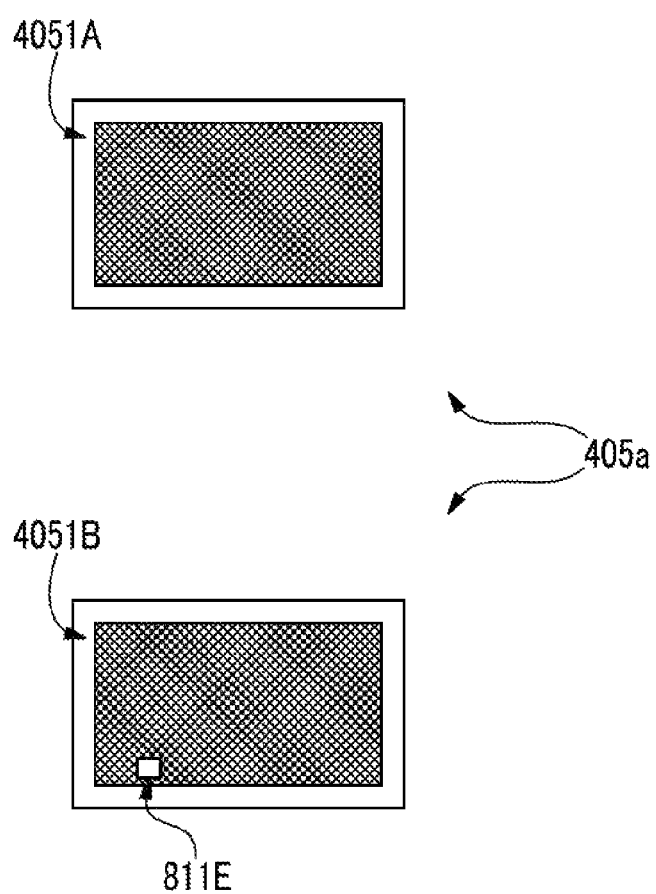
FIG. 9 is a diagram illustrating black images which are output by an image forming apparatus on the basis of black image data stored in a chart image memory of the image forming apparatus according to a fifth exemplary embodiment.

FIG. 9 is a diagram illustrating the black images which are output by the image forming apparatus on the basis of the black image data stored in the chart image memory of the image forming apparatus according to the fifth exemplary embodiment.

The black images shown in the drawing are constituted of an image, which is solid black except for a peripheral margin portion, on a front surface 4051A and an image, which is solid black except for a peripheral margin portion and a white target image 811E, on a back surface 4051B, and are images which are output onto both surfaces of the sheet of paper with a predetermined size when an instruction to output the chart images is issued by a user (that is, when the chart image output field 2701a of FIG. 3 is touched by a user's finger). In the fifth exemplary embodiment, the chart images are read by using a black sheet of paper 405a having the black images.

Figure 10A:
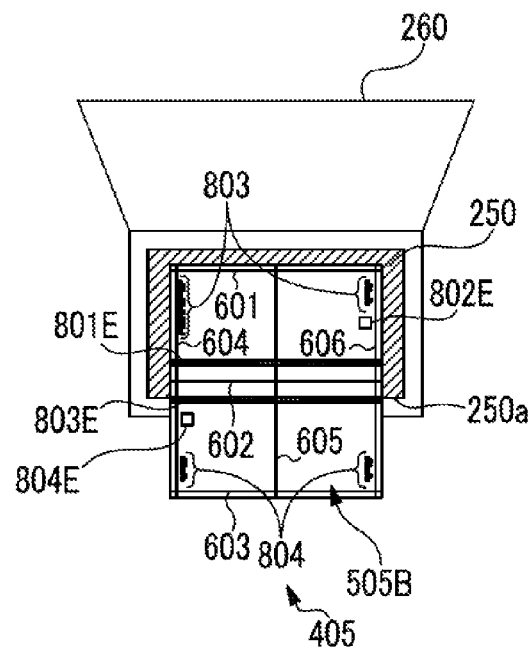
FIGS. 10A and 10B are diagrams illustrating a situation in which the sheet of paper is aligned on the transparent glass when the large-size sheet of paper having the chart images is read in the fifth exemplary embodiment.
Figure 10B:
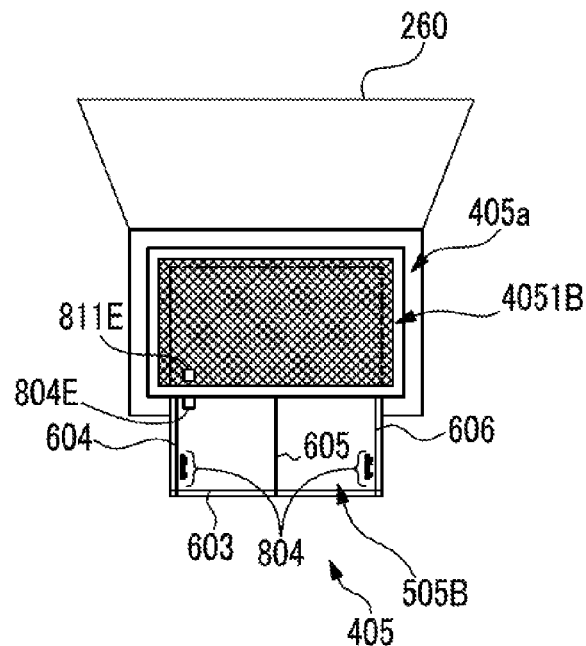

FIGS. 10A and 10B are diagrams illustrating a situation in which a sheet of paper 405 is aligned on the transparent glass 250 when the large-size sheet of paper 405 having the chart images is read in the fifth exemplary embodiment.

FIGS. 10A and 10B show an exemplary case where the upper side part of the front surface is placed toward the transparent glass 250 side in order to read the upper side part of the front surface of the large-size sheet of paper 405. In this case, as shown in FIG. 10A, a back surface 505B of the large-size sheet of paper 405 is visible from the outside. In the chart images on the large-size sheet of paper 405 of FIG. 10A, the two alignment images 801A and 802A on the upper side of the center horizontal line 602 and the two alignment images 803A and 804A on the lower side thereof, which are represented by the substantially triangular marks, in the chart images on the large-size sheet of paper 400 of FIG. 3 are replaced by alignment images 801E, 802E, 803E, and 804E. Here, the alignment image 801E, which has a shape like a single line extending in the horizontal direction, and the alignment image 802E, which is represented by the substantially quadrangular mark, are provided on the upper side of the center horizontal line 602. In addition, the alignment image 803E, which has a shape like a single line extending in the horizontal direction, and the alignment image 804E, which is represented by the substantially quadrangular mark, are provided on the lower side of the center horizontal line 602. That is, although not shown in FIGS. 10A and 10B, the same alignment images 801E, 802E, 803E, and 804E are printed on the front surface opposite to the back surface 505B of FIGS. 10A and 10B together with the detection images which are formed of the six lines 601, 602, 603, 604, 605, and 606. Further, four identification images the same as those of FIG. 3 for identifying those with each other are printed on four parts of the upper and lower side parts of the back surface 505B and the upper and lower side parts of the front surface opposite thereto, respectively. In FIG. 10A, among the images, only two identification images 803 and 804 on the back surface 505B are shown.

In order to read the upper side part of the front surface of the large-size sheet of paper 405, the upper side part of the front surface is placed on the transparent glass 250. In this case, the alignment image 803E on the lower side of the drawing is aligned with the lower side edge 250a of the transparent glass 250 such that the line of the alignment image 803E on the lower side of the drawing between the alignment images 801E and 803E having substantially linear shapes on the back surface 505B is on the line of the lower side edge 250a of the transparent glass 250 as shown in FIG. 10A. Thereby, the large-size sheet of paper 405 is aligned with the transparent glass 250 (that is, the platen) in the vertical direction of the drawing.

Next, as shown in FIG. 10B, the black sheet of paper 405a is placed on the upper side part of the back surface 505B of the large-size sheet of paper 405 on the transparent glass 250. Thereby, the upper side part is completely covered by the black sheet of paper 405a. Here, the transparent glass 250 is formed to be slightly sunken compared with the surface around the transparent glass 250. Hence, there is a level difference between the edges of the transparent glass 250 and the periphery thereof. In a case of reading the chart images in the fifth exemplary embodiment, it is possible to bump the black sheet of paper 405a into both of the upper side edge 250c and the left side edge 250b of the transparent glass 250 with the level difference, and thereby the black sheet of paper 405a is aligned with the transparent glass 250. The alignment image 804E, which is represented by the substantially quadrangular mark, on the lower side of the back surface 505B of FIG. 10A is aligned with the target image 811E of the black sheet of paper 405a, which is aligned as described above, with the lower margin portion of the black sheet of paper 405a interposed therebetween as shown in FIG. 10B. Thereby, the large-size sheet of paper 405 is aligned with the transparent glass 250 (that is, the platen) in the horizontal direction of the drawing. Here, a proportion of the peripheral margin portion of the black sheet of paper 405a to the entire area of the black sheet of paper 405a is extremely small. In the above-mentioned alignment state, the periphery of the upper side part of the front surface as a reading target, which is opposite to the upper side part of the back surface 505B, is covered by the black portion of the black sheet of paper 405a. Hence, although the margin portion of the black sheet of paper 405a is present, it is possible to avoid the effect on the edge detection for the upper side part of the front surface.

After the sheet is placed as described above, in a similar manner to FIG. 4C, reading is performed in a state where the sheet is covered by the upper cover 260, and the readout data is generated.

Next, reading is performed on the lower side part of the front surface of the large-size sheet of paper 405 in the above-mentioned order, and reading is further performed on each of the upper and lower side parts of the back surface 505B. Here, in the case of reading the lower side part of the front surface, when the lower side part of the front surface is intended to be placed on the transparent glass 250, the alignment images 801E and 802E on the upper side of the back surface 505B are respectively aligned with the lower side edge 250a of the transparent glass 250 described in FIG. 10A and the target image 811E of the black sheet of paper 405a aligned as described in FIG. 10B. In the case of reading the upper and lower side parts of the back surface 505B, in a similar manner to the back surface 505B, alignment is also performed by using the four alignment images on the front surface. As described above, in either of the reading operations, by using the alignment images 801E and 802E on the upper side or the alignment images 803E and 804E on the lower side, the large-size sheet of paper 405 is aligned with the transparent glass 250 (that is, the platen) in the vertical and horizontal directions of the drawing.

As described above, the readout data is generated for each of the upper and lower side parts of the front surface and the upper and lower side parts of the back surface 505B, and is stored in the readout image memory 64. The subsequent flow of the correction amount calculation is the same as that of the first exemplary embodiment, and thus a repeated description will be omitted.

In the fifth exemplary embodiment, in a similar manner to the first exemplary embodiment, any readout data reliably contains the position information of the center horizontal line 602, and the corners of the sheet of paper are separated from the edges of the transparent glass. As a result, when the respective upper side parts and the respective lower side parts of the front surface and the back surface are read, the image forming apparatus according to the fifth exemplary embodiment is unlikely to cause a reading failure, in which the readout data not containing data of common portions (for example, the center horizontal line 602) is generated and thus it is difficult to calculate the correction amounts when a user makes an error in placing the large-size sheet of paper 405, and a reading failure in which it is difficult to sense the edge positions of the sheet of paper when the readout images are analyzed.

Further, only by using the lower side edge 250a of the transparent glass 250 and the target image 811E of the aligned black sheet of paper 405a as targets, the sheet of paper may be aligned, and thus it becomes easy to align the sheet of paper.

In particular, in the fifth exemplary embodiment, the large-size sheet of paper 405 is aligned in the horizontal direction of the drawing. Hence, it is possible to prevent the large-size sheet of paper 405 from protruding out of the transparent glass 250 (that is, the platen) in the horizontal direction of the drawing.

Furthermore, in the fifth exemplary embodiment, the black sheet of paper 405a is output on the basis of the black image data which is stored in the chart image memory of the image forming apparatus according to the fifth exemplary embodiment. Hence, even when the black sheet of paper 405a is lost or damaged, it becomes easy to get a new black sheet of paper 405a.

Sixth Exemplary Embodiment

Next, an image forming apparatus according to a sixth exemplary embodiment will be described.

The image forming apparatus according to the sixth exemplary embodiment is different from the image forming apparatus 10 according to the first exemplary embodiment shown in FIG. 1 in that chart image data, which is different from the chart image data stored in the chart image memory 65 of the image forming apparatus 10 according to the first exemplary embodiment, is stored in the chart image memory and the target image for aligning the chart images is printed on the upper cover. Except the point described above, the configuration and the operation of the image forming apparatus according to the sixth exemplary embodiment are the same as those of the image forming apparatus 10 according to the first exemplary embodiment. Here, the chart images, which are represented by the chart image data, in the sixth exemplary embodiment is different from the chart images in the first exemplary embodiment shown in FIG. 3 only in that the chart images have different alignment images. Otherwise, the chart images are the same as the chart images in the first exemplary embodiment shown in FIG. 3. As described above, the chart images are different from those of the first exemplary embodiment, but in the image forming apparatus according to the sixth exemplary embodiment, the correction amounts are calculated in the same order as that of the image forming apparatus according to the first exemplary embodiment. The following description will be given focusing on the different points from the first exemplary embodiment, and a repeated description of the same components as the first exemplary embodiment will be omitted. Further, in the drawing, the components the same as those of the first exemplary embodiment are represented by the same reference numerals and signs.

Figure 11A:
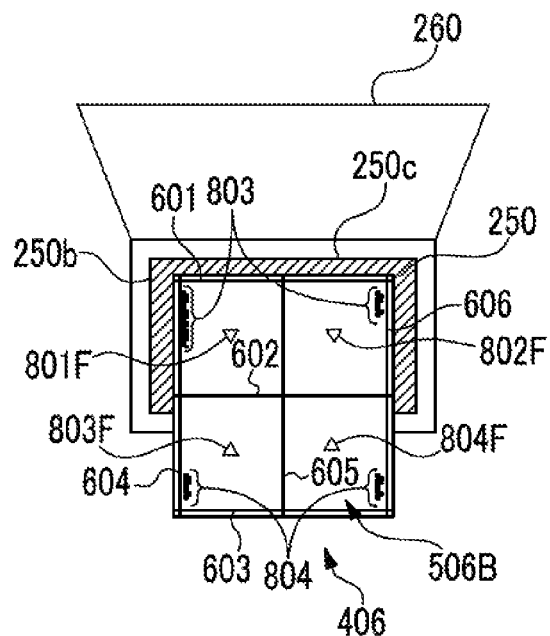
FIGS. 11A to 11C are diagrams illustrating a situation in which the sheet of paper is aligned on the transparent glass when the large-size sheet of paper having the chart images is read in a sixth exemplary embodiment.
Figure 11B:
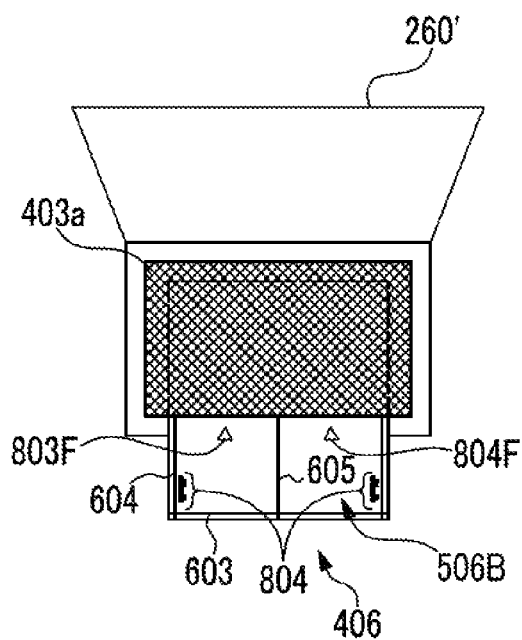
Figure 11C:
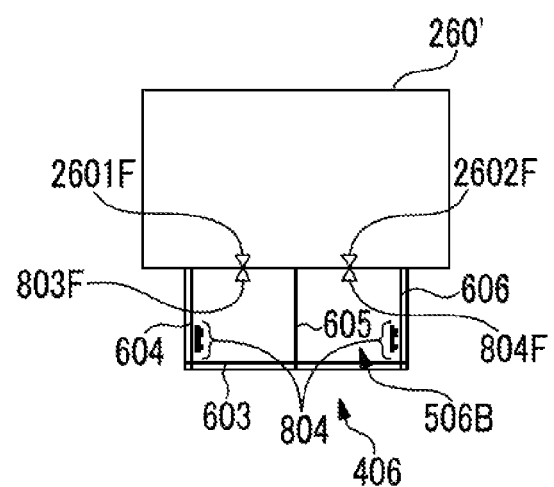

FIGS. 11A to 11C are diagrams illustrating a situation in which a sheet of paper 406 is aligned on the transparent glass 250 when the large-size sheet of paper 406 having the chart images is read in the sixth exemplary embodiment.

FIGS. 11A to 11C show an exemplary case where the upper side part of the front surface is placed toward the transparent glass 250 side in order to read the upper side part of the front surface of the large-size sheet of paper 406.

In this case, as shown in FIG. 11A, a back surface 506B of the large-size sheet of paper 406 is visible from the outside. In the chart images on the large-size sheet of paper 406 of FIG. 11A, the two alignment images 801A and 802A and the two alignment images 803A and 804A in the chart images on the large-size sheet of paper 400 of FIG. 3 are replaced by two alignment images 801F and 802F and two alignment images 803F and 804F. Here, the two alignment images 801A and 802A are respectively provided in the vicinities of the edges of the sheet of paper 400 on the upper side of the center horizontal line 602, and the two alignment images 803A and 804A are respectively provided in the vicinities of the edges of the sheet of paper 400 on the lower side of the center horizontal line 602, but the two alignment images 801F and 802F are respectively provided at positions close to the vertical line 605 on the upper side of the center horizontal line 602, and the two alignment images 803F and 804F are respectively provided at positions close to the vertical line 605 on the lower side of the center horizontal line 602. That is, although not shown in FIG. 11A, the same alignment images 801F, 802F, 803F, and 804F are printed on the front surface opposite to the back surface 506B of FIG. 11A together with the detection images which are formed of the six lines 601, 602, 603, 604, 605, and 606. Further, four identification images the same as those of FIG. 3 for identifying those with each other are printed on four parts of the upper and lower side parts of the back surface 506B and the upper and lower side parts of the front surface opposite thereto, respectively. In FIG. 11A, among the images, only two identification images 803 and 804 on the back surface 506B are shown.

Next, as shown in FIG. 11B, the black sheet of paper 403a, of which both entire surfaces are solid black, is placed on the upper side part of the back surface 506B of the large-size sheet of paper 406 on the transparent glass 250. Thereby, the upper side part is completely covered by the black sheet of paper 403a. Here, similarly to the black sheet of paper 400a shown in FIG. 4B, the black sheet of paper 403a shown in FIG. 11B is for providing a black background to the large-size sheet of paper 406 such that the edge portion of the large-size sheet of paper 406 is clearly recognized through the reading. That is, the black sheet of paper 403a covers at least a part of the space between the end portion of the transparent glass 250 and the large-size sheet of paper 406.

Subsequently, as shown in FIG. 11C, the upper side part of the back surface 506B of the large-size sheet of paper 406 and the black sheet of paper 403a are covered by an upper cover 260'. Here, two target images 2601F and 2602F are printed on the lower side edge of the upper cover 260' shown in FIG. 11C. Thus, the two alignment images 803F and 804F on the lower side of the back surface 506B of FIG. 11A are aligned with two target images 2601F and 2602F of the closed upper cover 260' as shown in FIG. 11B. Thereby, the large-size sheet of paper 406 is aligned with the transparent glass 250 (that is, the platen) in the vertical and horizontal directions of the drawing. After the sheet is placed as described above, reading is performed, and the readout data is generated.

Next, reading is performed on the lower side part of the front surface of the large-size sheet of paper 406 in the above-mentioned order, and the reading is further performed on each of the upper and lower side parts of the back surface 506B. Here, in the case of reading the lower side part of the front surface, when the lower side part of the front surface is intended to be placed on the transparent glass 250, the alignment images 801F and 802F on the upper side of the back surface 506B are aligned with the target images 2601F and 2602F of the upper cover 260' as described in FIG. 11B. In the case of reading the upper and lower side parts of the back surface 506B, in a similar manner to the back surface 506B, alignment is also performed by using the four alignment images on the front surface. As described above, in either of the reading operations, by using the alignment images 801F and 802F on the upper side or the alignment images 803F and 804F on the lower side, the large-size sheet of paper 406 is aligned with the transparent glass 250 (that is, the platen) in the vertical and horizontal directions of the drawing.

As described above, the readout data is generated for each of the upper and lower side parts of the front surface and the upper and lower side parts of the back surface 506B, and is stored in the readout image memory 64. The subsequent flow of the correction amount calculation is the same as that of the first exemplary embodiment, and thus a repeated description will be omitted.

In the sixth exemplary embodiment, in a similar manner to the first exemplary embodiment, any of the readout data definitely contains the position information of the center horizontal line 602, and the corners of the sheet of paper are separated from the edges of the transparent glass. As a result, when the respective upper side parts and the respective lower side parts of the front surface and the back surface are read, the image forming apparatus according to the sixth exemplary embodiment is unlikely to cause a reading failure, in which the readout data not containing data of common portions (for example, the center horizontal line 602) is generated and thus it is difficult to calculate the correction amounts when a user makes an error in placing the large-size sheet of paper 406, and a reading failure in which it is difficult to sense the edge positions of the sheet of paper when the readout images are analyzed.

Further, only by using the target images 2601F and 2602F of the upper cover 260' as targets, the sheet of paper may be aligned, and thus it becomes easy to align the sheet of paper.

In particular, in the sixth exemplary embodiment, the large-size sheet of paper 406 is aligned in the horizontal direction of the drawing. Hence, it is possible to prevent the large-size sheet of paper 406 from protruding out of the transparent glass 250 (that is, the platen) in the horizontal direction of the drawing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A paper document for measurement of the position of an image relative to the paper document for an image reading apparatus, the document comprising:
a first surface; and
a second surface,
wherein a measurement image for measuring a position of an image relative to the paper document is formed on the first surface, a designation image for designating a paper document position, at which the paper document is placed on the image reading apparatus that reads an image, is formed on the second surface, the second surface being a different paper surface from the first, and wherein the paper document is spaced from an end portion of a reading region of the image reading apparatus by placing a portion of the paper document on the reading region of the image reading apparatus with the first surface of the paper document facing the reading region, and adjusting the paper document in accordance with the designation of the designation image formed on the second surface of the paper document, and the designation image is formed such that the measurement image is placed in the reading region of the image reading apparatus.

2. The paper document according to claim 1, wherein the designation image is used as an image for designating a position at which the paper document is placed on the image reading apparatus that reads an image in the reading region surrounded by four sides, and wherein the designation image is formed to be spaced from end portions of at least three sides among four sides of the reading region of the image reading apparatus by placing the paper document in accordance with the designation of the designation image.

3. The paper document according to claim 1, wherein when the image reading apparatus performs reading in a state where a cover plate for covering the document is further placed on the paper document, the designation image is formed such that the paper document is spaced from the end portion by associating the designation image with a background section image formed in a background section or an end portion of the background section.

4. The paper document according to claim 1, wherein the designation image is formed such that the paper document is spaced from the end portion by associating an alignment image with a reading section image formed in the reading section or an end portion of the reading region of the image reading apparatus.

5. A document for measurement of the position of the image relative to the document for an image reading apparatus, the document comprising:

a first surface; and a second surface, wherein a measurement image for measuring a position of an image relative to the document is formed on the first surface, a designation image for designating a document position, at which the document is placed on the image reading apparatus that reads an image, is formed on the second surface, and wherein the document is spaced from an end portion of a reading region of the image reading apparatus by placing the document in accordance with the designation of the designation image, and the designation image is formed such that the measurement image is placed in the reading region of the image reading apparatus, wherein the measurement image for measuring the position is formed of at least first, second, and third images, wherein when reading the document so as to measure positions of the images, the image reading apparatus reads the first surface a plurality of times so as to read the first and second images at first reading operation and read the second and third images at the subsequent reading operations, and wherein by placing the document on the basis of the alignment image, the document is placed at a position at which the second image is included in the reading region of the reading section, and the designation image is formed such that either the first image or the third image protrudes out of the reading region.

6. The document for measurement of the position of the image relative to the document for the image reading apparatus according to claim 5, wherein an image for distinguishing the reading regions at the time of performing the reading operations a plurality of times is formed on the second surface.

7. The document for measurement of the position of the image relative to the document for the image reading apparatus according to claim 5, wherein an image representing a sequence of the reading operations at the time of performing the reading operations a plurality of times is formed on the second surface.

8. An image forming apparatus comprising:

an image forming section that forms a measurement image, which is for measuring a position of an image relative to a sheet of paper, and a designation image, which is for designating a document position of a document to be placed, respectively on different surfaces of the sheet of paper;

a platen that is for placing a document having an image formed on the sheet of paper by the image forming section;

an image reading section that reads the image of the document placed on the platen;

a detecting section that detects an end portion of the document; and a calculation section that calculates the position of the image relative to the document by using the image, which is read by the image reading section, and the end portion which is detected by the detecting section, wherein the measurement image is read by the image reading section in a state where the document is spaced from an end portion of a reading region of the platen by placing the document on the platen in accordance with designation of the designation image and the measurement image is placed in the reading region of the image reading section.

9. An image forming apparatus comprising:

an image forming section that forms a measurement image, which is for measuring a position of an image relative to a sheet of paper, and a designation image, which is for designating a document position of a document to be placed on a platen, respectively on different surfaces of the sheet of paper;

a platen that is for placing a document having an image formed on the sheet of paper by the image forming section;

an image reading section that reads the image of the document, which is placed on the platen, in a state where the document is spaced from an end portion of a reading region of the platen by placing the document on the platen in accordance with designation of the designation image and the measurement image is placed in the reading region of the image reading section; and a correction section that corrects relative positions of the image formed in the document and an end portion of the document in accordance with a result of the reading performed by the image reading section.

10. The image forming apparatus according to claim 8, wherein the image forming section forms a cover sheet which is used to cover the document, and wherein when reading the document on the platen, the image reading section performs the reading in a state where the document is spaced from the end portion by further placing the cover sheet on the document and associating the designation image with an image formed on a background section or an end portion of the background section.

11. The image forming apparatus according to claim 10, wherein when reading the document in which at least first, second, and third images are formed as the measurement image so as to measure positions of the images, the image reading section reads a first surface a plurality of times so as to read the first and second images at first reading operation and read the second and third images at the subsequent reading operations, wherein by placing the document on the basis of the alignment image, the document is placed at a position at which the second image is included in the reading region of the image reading section, and the document is placed such that either the first image or the third image protrudes out of the reading region, and wherein the image forming apparatus further comprises a calculation section that calculates a distance between the first image and the third image on the basis of the second image which is read by the image reading section a plurality of times.

12. A cover plate,
wherein on a paper document on which a designation image for designating a position of an original document to be placed on a platen is formed, an indication image for indicating a position of the paper document to be placed is formed, and wherein when the paper document is read, in a state where the cover plate is placed at a position designated as the position at which the paper document is placed on the platen, the indication image is formed such that the paper document is spaced from an end portion of a reading region of the image reading section by placing the paper document so as to associate the designation image with the indication image.

13. An image reading apparatus comprising:
a platen that is for placing a document having an image formed on a sheet of paper by an image forming section for respectively forming a measurement image, which is for measuring a position of an image relative to the sheet of paper, and a designation image, which is for designating a document position of the document to be placed on the platen, on different surfaces of the sheet of paper;
an image reading section that reads the image of the document placed on the platen;
a detecting section that detects an end portion of the document; and
a calculation section that calculates the position of the image relative to the document by using the image, which is read by the image reading section, and the end portion which is detected by the detecting section,
wherein the measurement image is read by the image reading section in a state where the document is spaced from an end portion of a reading region of the platen by placing the document on the platen in accordance with designation of the designation image and the measurement image is placed in the reading region of the image reading section.

14. An image reading apparatus comprising:
a platen that is for placing a document having an image formed on a sheet of paper by an image forming section for respectively forming a measurement image, which is for measuring a position of an image relative to the sheet of paper, and a designation image, which is for designating a document position of the document to be placed on the platen, on different surfaces of the sheet of paper;
an image reading section that reads the image of the document, which is placed on the platen, in a state where the document is spaced from an end portion of a reading region of the platen by placing the document on the platen in accordance with designation of the designation image and the measurement image is placed in the reading region of the image reading section; and
a correction section that corrects relative positions of the image formed in the document and an end portion of the document in accordance with a result of the reading performed by the image reading section.

15. An image forming apparatus comprising:
an image forming section that forms a measurement image, which is for measuring a position of an image relative to a sheet of paper, and a designation image, which is for designating a document position of a document to be placed, respectively on different surfaces of the sheet of paper;
a platen whereby the document having an image formed on the sheet of paper by the image forming section is placed;
a detecting section that detects an end portion of the document; and
a calculation section that calculates the position of the image relative to the document by using the end portion, which is detected by the detecting section, and the image which is read by an image reading section for reading the image of the document placed on the platen,
wherein the measurement image is read by the image reading section in a state where the document is spaced from an end portion of a reading region of the platen by placing the document on the platen in accordance with designation of the designation image and the measurement image is placed in the reading region of the image reading section.

16. An image forming apparatus comprising:
an image forming section that forms a measurement image, which is for measuring a position of an image relative to a sheet of paper, and a designation image, which is for designating a document position of a document to be placed, respectively on different surfaces of the sheet of paper;
a platen whereby the document having an image formed on the sheet of paper by the image forming section is placed; and
a correction section that corrects relative positions of the image formed in the document and an end portion of the document in accordance with a result of the reading performed by an image reading section for reading the image of the document, which is placed on the platen, in a state where the document is spaced from an end portion of a reading region of the platen by placing the document on the platen in accordance with designation of the designation image and the measurement image is placed in the reading region of the image reading section.

17. An image forming method comprising:
forming (1) a measurement image, which is for measuring a position of an image relative to a sheet of paper, and (2) a designation image, which is for designating a document position of a paper document to be placed on a platen, respectively, on different surfaces of the sheet of paper;
placing a paper document having an image formed on the sheet of paper;

reading the image of the paper document placed on the platen;

detecting an end portion of the paper document; and calculating the position of the image relative to the paper document by using the image, which is read, and the end portion which is detected, wherein the measurement image is read in a state where the paper document is spaced from an end portion of a reading region of the platen by placing the paper document on the platen in accordance with designation of the designation image and the measurement image is placed in the reading region.

18. An image forming method comprising:

forming a measurement image, which is for measuring a position of an image relative to a sheet of paper, and a designation image, which is for designating a document position of a document to be placed on a platen, respectively on different surfaces of the sheet of paper;

placing a document having an image formed on the sheet of paper;

reading the image of the document, which is placed on the platen, in a state where the document is spaced from an end portion of a reading region of the platen by placing the document on the platen in accordance with designation of the designation image and the measurement image is placed in the reading region; and correcting relative positions of the image formed in the document and an end portion of the document in accordance with a result of the reading.

19. An image reading method comprising:

placing a paper document having an image formed on a sheet of paper;

reading the image of the paper document placed on the platen;

detecting an end portion of the paper document; and calculating the position of the image relative to the paper document by using the image, which is read, and the end portion which is detected, wherein the measurement image is read in a state where the paper document is spaced from an end portion of a reading region of the platen by placing the paper document on the platen in accordance with designation of the designation image and the measurement image is placed in the reading region.

20. An image reading method comprising:

placing a paper document having an image formed on a sheet of paper;

reading the image of the paper document, which is placed on the platen, in a state where the paper document is spaced from an end portion of a reading region of the platen by placing the paper document on the platen in accordance with designation of the designation image and the measurement image is placed in the reading region; and correcting relative positions of the image formed in the paper document and an end portion of the paper document in accordance with a result of the reading.

\* \* \* \* \*